US012579207B2

(12) United States Patent
Cheng et al.

(10) Patent No.: US 12,579,207 B2
(45) **Date of Patent: \*Mar. 17, 2026**

(54) LOCATION-BASED SEARCHING USING A SEARCH AREA THAT CORRESPONDS TO A GEOGRAPHICAL LOCATION OF A COMPUTING DEVICE

(71) Applicant: GOOGLE LLC, Mountain View, CA (US)

(72) Inventors: Tak Keung Cheng, Los Altos, CA (US); James R. von Behren, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,922

(22) Filed: May 30, 2024

(65) Prior Publication Data

US 2024/0320281 A1 Sep. 26, 2024

Related U.S. Application Data

(63) Continuation of application No. 17/862,226, filed on Jul. 11, 2022, now Pat. No. 12,001,492, which is a (Continued)

(51) Int. Cl.
*G06F 16/00* (2019.01)
*G06F 16/951* (2019.01)
(Continued)

(52) U.S. Cl.
CPC ........ *G06F 16/9537* (2019.01); *G06F 16/951* (2019.01); *G06F 16/9538* (2019.01); *H04W 4/021* (2013.01); *H04W 4/21* (2018.02)

(58) Field of Classification Search
None
See application file for complete search history.

(56) References Cited

U.S. PATENT DOCUMENTS

| | | | |
|---|---|---|---|
| 5,030,117 A | 7/1991 | Delorme | |
| 6,999,079 B2 * | 2/2006 | Kida .................... | G06T 19/003 |
| | | | 345/949 |

(Continued)

FOREIGN PATENT DOCUMENTS

| | | |
|---|---|---|
| CN | 101573686 | 11/2009 |
| JP | H09167166 | 6/1997 |

(Continued)

OTHER PUBLICATIONS

Chen, G. et al.;. "A Survey of Context-Aware Mobile Computing Research." Dartmouth Computer Science Technical Report TR2000-381; Dartmouth College, Department of Computer Science, 16 pages; 2000.

(Continued)

*Primary Examiner* — Farhan M Syed
(74) *Attorney, Agent, or Firm* — Gray Ice Higdon

(57) ABSTRACT

In general, the subject matter described in this specification can be embodied in methods, systems, and programs for providing location-based information. A geographical location of a mobile computing device is received at a server system. A request for content is received at the server system and from the mobile computing device. A search area that corresponds to the geographical location is selected by the sever system. The search area is selected from among a collection of search areas that correspond to the geographical location. At least one of the search areas in the collection is geographically nested within at least one other of the search areas. A search result that is most-relevantly ranked for the selected search area is determined by the server (Continued)

system. Content that represents the determined search result is provided by the server system and for receipt by the mobile computing device.

20 Claims, 21 Drawing Sheets

Related U.S. Application Data continuation of application No. 16/672,932, filed on Nov. 4, 2019, now Pat. No. 11,386,167, which is a continuation of application No. 13/773,499, filed on Feb. 21, 2013, now Pat. No. 10,467,296, which is a continuation of application No. 13/251,077, filed on Sep. 30, 2011, now Pat. No. 8,386,514, which is a continuation of application No. 12/954,274, filed on Nov. 24, 2010, now Pat. No. 8,396,888.

(60) Provisional application No. 61/266,870, filed on Dec. 4, 2009.

(51) Int. Cl.
| | |
|---|---|
| *G06F 16/9537* | (2019.01) |
| *G06F 16/9538* | (2019.01) |
| *H04W 4/021* | (2018.01) |
| *H04W 4/21* | (2018.01) |

(56) References Cited

U.S. PATENT DOCUMENTS

| | | | | |
|---|---|---|---|---|
| 7,336,274 | B2* | 2/2008 | Kida | G06T 17/05 |
| | | | | 345/557 |
| 7,376,640 | B1 | 5/2008 | Anderson et al. | |
| 7,548,915 | B2* | 6/2009 | Ramer | G06Q 30/0247 |
| | | | | 707/999.005 |
| 8,027,879 | B2* | 9/2011 | Ramer | G06Q 30/0241 |
| | | | | 705/28 |
| 8,150,614 | B2* | 4/2012 | Uyama | G01C 21/3446 |
| | | | | 340/995.23 |
| 8,150,814 | B2 | 4/2012 | Uyama | |
| 8,386,514 | B2 | 2/2013 | Cheng et al. | |
| 8,396,888 | B2 | 3/2013 | Cheng et al. | |
| 8,620,579 | B1* | 12/2013 | Upstill | G01C 21/3679 |
| | | | | 701/428 |
| 10,467,296 | B2 | 11/2019 | Cheng et al. | |
| 11,386,167 | B2 | 7/2022 | Cheng et al. | |
| 2002/0062310 | A1* | 5/2002 | Marmor | G06F 16/9537 |
| 2002/0070981 | A1* | 6/2002 | Kida | G06T 17/05 |
| | | | | 715/833 |
| 2004/0198386 | A1 | 10/2004 | Dupray | |
| 2005/0004903 | A1 | 1/2005 | Tsuda | |
| 2005/0160080 | A1 | 7/2005 | Dawson | |
| 2005/0160082 | A1 | 7/2005 | Dawson | |
| 2006/0092155 | A1* | 5/2006 | Kida | G01C 21/20 |
| | | | | 345/419 |
| 2006/0123014 | A1* | 6/2006 | Ng | G06F 16/9538 |
| 2007/0061198 | A1* | 3/2007 | Ramer | G06Q 30/0255 |
| | | | | 705/14.69 |
| 2007/0061242 | A1 | 3/2007 | Ramer et al. | |
| 2007/0061243 | A1* | 3/2007 | Ramer | G06Q 30/0275 |
| | | | | 705/37 |
| 2007/0061245 | A1* | 3/2007 | Ramer | G06Q 30/02 |
| | | | | 705/37 |
| 2007/0061303 | A1* | 3/2007 | Ramer | G06F 16/951 |
| 2007/0073717 | A1* | 3/2007 | Ramer | G06F 16/951 |
| 2007/0073719 | A1* | 3/2007 | Ramer | H04L 67/52 |
| 2007/0100650 | A1* | 5/2007 | Ramer | G06Q 30/0241 |
| | | | | 705/26.1 |
| 2007/0100652 | A1* | 5/2007 | Ramer | H04M 15/06 |
| | | | | 705/1.1 |
| 2007/0100805 | A1* | 5/2007 | Ramer | G06F 16/951 |
| 2007/0118533 | A1* | 5/2007 | Ramer | G06F 16/635 |
| 2007/0150362 | A1* | 6/2007 | Sharma | G06Q 30/0603 |
| | | | | 705/26.8 |
| 2007/0192294 | A1* | 8/2007 | Ramer | G06Q 30/02 |
| 2007/0198485 | A1* | 8/2007 | Ramer | G06F 16/9535 |
| 2007/0233864 | A1 | 10/2007 | Xie et al. | |
| 2007/0288427 | A1* | 12/2007 | Ramer | G06F 16/951 |
| 2008/0005086 | A1 | 1/2008 | Moore | |
| 2008/0162534 | A1 | 7/2008 | Muhonen et al. | |
| 2008/0168033 | A1 | 7/2008 | Ott et al. | |
| 2008/0168052 | A1 | 7/2008 | Ott et al. | |
| 2008/0172357 | A1 | 7/2008 | Rechis et al. | |
| 2008/0214148 | A1* | 9/2008 | Ramer | G06F 16/9577 |
| | | | | 455/414.1 |
| 2008/0214150 | A1* | 9/2008 | Ramer | G06F 16/9537 |
| | | | | 455/414.1 |
| 2008/0214152 | A1* | 9/2008 | Ramer | G06F 16/68 |
| | | | | 455/414.1 |
| 2008/0214156 | A1* | 9/2008 | Ramer | G06Q 30/0267 |
| | | | | 455/414.1 |
| 2008/0214162 | A1* | 9/2008 | Ramer | G06F 16/635 |
| | | | | 455/414.2 |
| 2008/0214166 | A1* | 9/2008 | Ramer | G06Q 30/02 |
| | | | | 455/414.3 |
| 2008/0215428 | A1* | 9/2008 | Ramer | G06Q 30/02 |
| | | | | 705/14.66 |
| 2008/0215475 | A1* | 9/2008 | Ramer | G06Q 30/0601 |
| | | | | 705/37 |
| 2008/0215623 | A1* | 9/2008 | Ramer | G06Q 30/08 |
| 2008/0242279 | A1* | 10/2008 | Ramer | G06F 16/951 |
| | | | | 707/E17.108 |
| 2008/0256044 | A1* | 10/2008 | Anderson | G06F 16/9537 |
| 2009/0005968 | A1* | 1/2009 | Vengroff | G06F 16/9537 |
| | | | | 701/425 |
| 2009/0132513 | A1* | 5/2009 | McKee | G06F 16/9537 |
| | | | | 707/999.005 |
| 2009/0132514 | A1* | 5/2009 | Kislyuk | G06F 16/9537 |
| | | | | 707/E17.084 |
| 2009/0132572 | A1* | 5/2009 | Massie | G06F 16/9537 |
| | | | | 707/999.102 |
| 2009/0132573 | A1* | 5/2009 | Reed, Jr. | G06F 16/29 |
| | | | | 707/999.102 |
| 2009/0132616 | A1 | 5/2009 | Winter et al. | |
| 2009/0132643 | A1* | 5/2009 | Reed, Jr. | G06F 16/29 |
| | | | | 709/203 |
| 2009/0132644 | A1* | 5/2009 | Frishert | G06F 16/9537 |
| | | | | 709/203 |
| 2009/0132645 | A1* | 5/2009 | Yang | G06F 16/9537 |
| | | | | 709/203 |
| 2009/0132646 | A1* | 5/2009 | Yang | G06F 16/9537 |
| | | | | 709/203 |
| 2009/0132927 | A1* | 5/2009 | Reed, Jr. | G06F 16/29 |
| | | | | 715/733 |
| 2009/0132929 | A1* | 5/2009 | Reed, Jr. | G06F 16/9537 |
| | | | | 715/733 |
| 2009/0144260 | A1* | 6/2009 | Bennett | G06F 16/3343 |
| | | | | 707/999.005 |
| 2009/0222329 | A1* | 9/2009 | Ramer | G06Q 30/0261 |
| | | | | 707/999.009 |
| 2009/0234711 | A1* | 9/2009 | Ramer | G06Q 30/0269 |
| | | | | 705/14.66 |
| 2009/0234745 | A1* | 9/2009 | Ramer | G06Q 30/0239 |
| | | | | 705/14.23 |
| 2009/0234861 | A1* | 9/2009 | Ramer | G06F 16/68 |
| 2009/0240569 | A1* | 9/2009 | Ramer | G06F 16/9577 |
| | | | | 707/999.01 |
| 2009/0240586 | A1* | 9/2009 | Ramer | G06F 16/9577 |
| | | | | 705/14.64 |
| 2010/0063877 | A1* | 3/2010 | Soroca | G06Q 30/0247 |
| | | | | 705/14.46 |
| 2010/0076845 | A1* | 3/2010 | Ramer | G06F 16/9535 |
| | | | | 705/14.52 |
| 2010/0076994 | A1* | 3/2010 | Soroca | G06F 16/68 |
| | | | | 707/769 |
| 2010/0082431 | A1* | 4/2010 | Ramer | G06Q 30/02 |
| | | | | 707/E17.109 |

(56) References Cited

U.S. PATENT DOCUMENTS

| | | | | |
|---|---|---|---|---|
| 2010/0094878 A1* | 4/2010 | Soroca | ............... | G06Q 30/0267 |
| | | | | 707/812 |
| 2010/0120450 A1* | 5/2010 | Herz | ..................... | H04L 67/75 |
| | | | | 455/456.3 |
| 2010/0125569 A1 | 5/2010 | Nair et al. | | |
| 2010/0125605 A1 | 5/2010 | Nair et al. | | |
| 2010/0153211 A1* | 6/2010 | Ramer | ............... | G06Q 30/0261 |
| | | | | 705/14.54 |
| 2010/0217663 A1* | 8/2010 | Ramer | ............... | G06Q 30/0256 |
| | | | | 705/14.42 |
| 2010/0287048 A1* | 11/2010 | Ramer | ................... | H04W 4/24 |
| | | | | 705/14.46 |
| 2010/0312572 A1* | 12/2010 | Ramer | ................... | G06Q 30/02 |
| | | | | 705/1.1 |
| 2011/0113100 A1* | 5/2011 | Chawla | ................... | H04W 4/21 |
| | | | | 709/205 |
| 2011/0137881 A1 | 6/2011 | Cheng et al. | | |
| 2011/0145076 A1* | 6/2011 | Ramer | ............... | G06Q 30/0276 |
| | | | | 705/14.72 |
| 2011/0153428 A1* | 6/2011 | Ramer | ................... | G06Q 30/00 |
| | | | | 705/14.64 |
| 2011/0202874 A1* | 8/2011 | Ramer | ............... | G06F 16/2428 |
| | | | | 715/810 |
| 2011/0219027 A1* | 9/2011 | Uyama | ............... | G01C 21/3423 |
| | | | | 707/769 |
| 2011/0258049 A1* | 10/2011 | Ramer | ............... | G06Q 30/0273 |
| | | | | 705/14.69 |
| 2012/0023088 A1 | 1/2012 | Cheng et al. | | |
| 2013/0173577 A1 | 7/2013 | Cheng et al. | | |
| 2020/0065339 A1 | 2/2020 | Cheng et al. | | |
| 2022/0342942 A1 | 10/2022 | Cheng et al. | | |

FOREIGN PATENT DOCUMENTS

| | | |
|---|---|---|
| JP | 2005025627 | 1/2005 |
| JP | 2006337066 | 12/2006 |
| JP | 2007094677 | 4/2007 |
| JP | 2007327913 | 12/2007 |
| JP | 2009157503 | 7/2009 |
| JP | 2009531773 | 9/2009 |
| JP | 2012515022 | 7/2012 |
| KR | 20020047808 | 6/2002 |
| KR | 100767660 | 10/2007 |
| KR | 20080031696 | 4/2008 |
| KR | 1020080031696 | 4/2008 |
| KR | 20080068845 | 7/2008 |
| KR | 20080105160 | 12/2008 |
| KR | 20090033989 | 4/2009 |
| KR | 100900323 | 6/2009 |
| KR | 20090056679 | 6/2009 |
| KR | 20090100435 | 9/2009 |
| KR | 20090100462 | 9/2009 |
| WO | 2003079229 | 9/2003 |
| WO | 2007127536 | 11/2007 |
| WO | 2008085637 | 7/2008 |
| WO | 2010144372 | 12/2010 |

OTHER PUBLICATIONS

EKMSystems. "ekmCompass public release; redirect your visitors to the most relevant website based on their geographic location."; Retrieved on Jul. 2, 2009] Retrieved from the Internet <URL: http://www.ekmsystems.co.uldnews/44/ekmcompass-public-release-redirect-your-visitors-to-the-most-relevant-website-based> (1 page); dated Dec. 10, 2008.

Japanese Patent Office; Office Action issued in Japanese Application No. 2012-542116, 8 pages ; dated Mar. 10, 2014.

European Patent Office; International Search Report & Written Opinion for Application No. PCT/US2010/058222, 8 pages; dated Jul. 12, 2011.

Australia Patent Office; Office Action issued in Australian Application No. 2010326176, 2 pages; dated Dec. 4, 2013.

Japanese Patent Office; Office Action issued in Japanese Application No. 2014-249699; 6 pages; dated Jan. 8, 2016.

European Patent Office; International Preliminary Report on Patentability for Application No. PCT/US2010/058222, 6 pages; dated Jun. 14, 2012.

Google Mobile. "Google Maps with My Location (Beta)." [Retrieved on May 5, 2010] Retrieved from the Internet <URL: http://www. google.com/mobile/gmm/mylocation/index.html> (2 pages); retrieved May 5, 2010.

Google. "Google Search: Minneapolis Jimmy Johns." Retrieved from the Internet < URL: http://www.google.com/search?h1=en &source=hp&q=minneapolis+jimmy+johns&aq=f&aq> (2 pages); retrieved May 5, 2010.

Korean Patent Office; Notice of Allowance in Korean Application No. 10-2012-7017090, 4 pages; dated Mar. 24, 2017.

Korean Patent Office; Notice of Allowance issued in Korean Application No. 10-2017-017413; 4 pages; dated Aug. 22, 2017.

Korean Patent Office; Notice of Allowance issued in Korean Application No. 10-2017-7017413; 3 pages; dated Dec. 11, 2017.

Korean Patent Office; Notice of Allowance issued in Korean Application No. 10-2018-7006874; 3 pages; dated Jun. 28, 2018.

Australia Patent Office; Office Action issued in Australian Application No. 2015201799; 6 pages; dated Apr. 22, 2016.

Canada Patent Office; Office Action issued in Canadian Application No. 2,782,369 ; 4 pages; dated Nov. 9, 2016.

China Patent Office; Office Action issued in Chinese Application No. 201080061366.X : 17 pages; dated Jun. 5, 2014.

European Patent Office; Office Action issued in European Application No. 10834983.8-1952; 5 pages; dated Feb. 13, 2017.

Japanese Patent Office; Office action issued in Japanese Application No. 2016-147298; 11 pages; dated Sep. 4, 2017.

Korean Patent Office; Office Action issued in Korean Application No. 10-2012-7017090 ; 20 pages; dated Jul. 11, 2016.

Korean Patent Office; Office Action issued in Korean Application No. 10-2018-7006874; 8 pages; dated Mar. 30, 2018.

Korean Patent Office; Office Action issued in Korean Application No. 10-2018-7006874; 8 pages; dated Oct. 31, 2018.

Patently Apple. "Apple Reveals a Powerful Location-Based Service for the iPhone." Retrieved on Nov. 24, 2010] Retrieved from the Internet <URL: http://www.patentlyapple.com/patently-apple/2010/ 05/apple-reveals-a-powerful-location-based-service-for-the-iphone. html > (5 pages); dated May 13, 2020.

European Patent Office; Summons to Attend Oral Proceedings, issued in European Application No. 10834983.8, 10 pages; dated Jun. 7, 2018.

Tajima et al., "Prototype Automatic Display System for Departure System Based on Location and Past Behavior", Information Processing Society of Japan Research Paper, Japan, Information Processing Society Corporation, vol. 2009-IOT-6, No. 8, pp. 1 to 6; dated Aug. 15, 2009.

Wireless Networking in the Developing World. "Captive Portals." Retrieved from the Internet <URL: http://www.vias.org/wirelessnetw/ wndw_08_04_04.html> (3 pages); retrieved May 5, 2010.

* cited by examiner

<u>300</u>

_300_

_300_

900

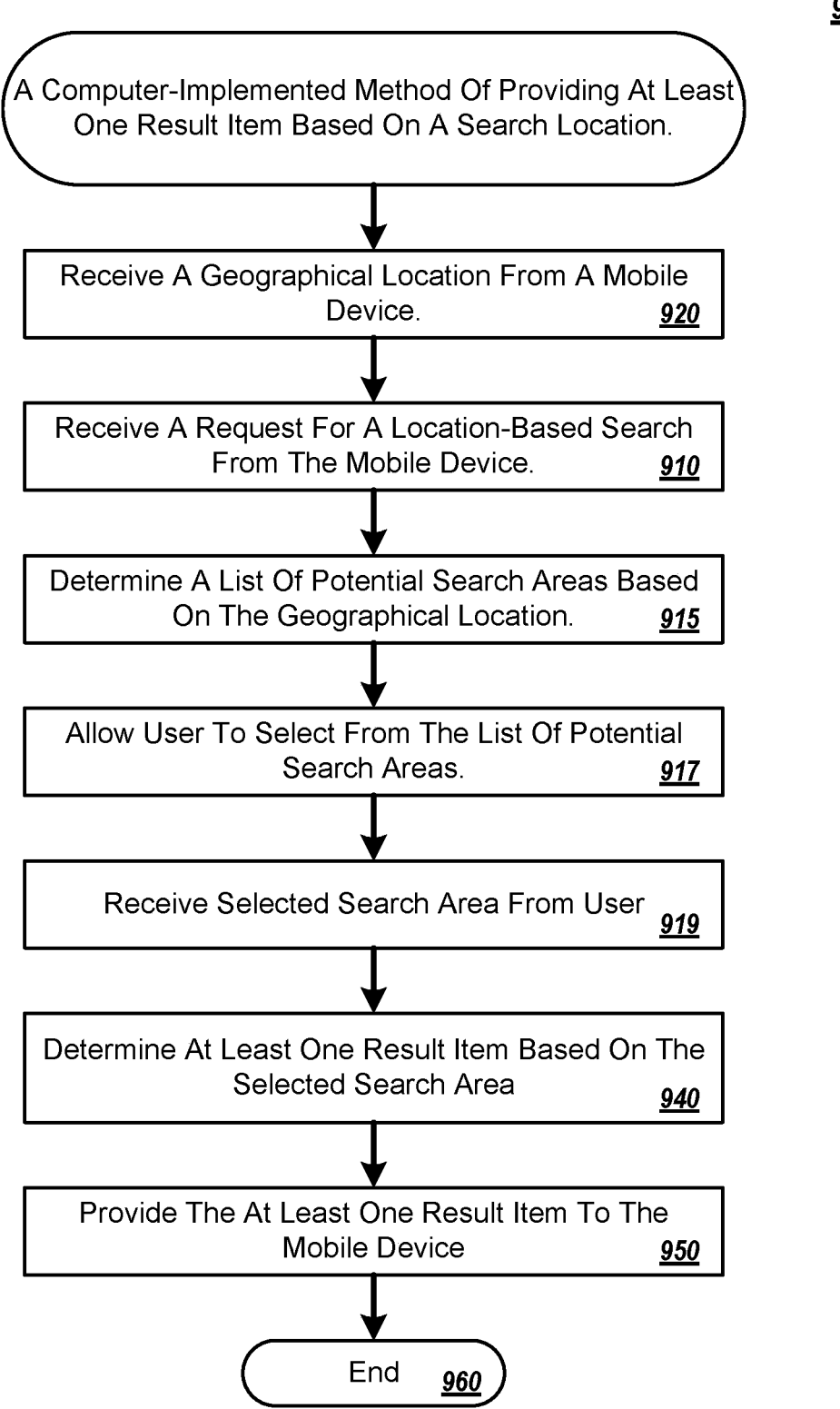

A Computer-Implemented Method Of Providing At Least One Result Item Based On A Search Location.

Receive A Geographical Location From A Mobile Device.        920

Receive A Request For A Location-Based Search From The Mobile Device.        910

Determine A List Of Potential Search Areas Based On The Geographical Location.        915

Allow User To Select From The List Of Potential Search Areas.        917

Receive Selected Search Area From User        919

Determine At Least One Result Item Based On The Selected Search Area        940

Provide The At Least One Result Item To The Mobile Device        950

End        960

FIG. 9B

LOCATION-BASED SEARCHING USING A SEARCH AREA THAT CORRESPONDS TO A GEOGRAPHICAL LOCATION OF A COMPUTING DEVICE

TECHNICAL FIELD

This document generally describes techniques, methods, systems, and mechanisms for location-based searching.

BACKGROUND

With the popularity of powerful, location-enabled mobile devices, user interest in quickly locating information about nearby places of interest has grown. To address this interest, systems and methods have been determined for retrieving information based on a determined geographical location. However, quickly finding relevant information about nearby places of interest may be tedious and burdensome.

Systems may, for example, identify a geographic location of a mobile device that submits a user query, such as by using global positioning system (GPS) information from the mobile device or tower triangulation techniques. Such information may be used by a server system to perform a "local" search, wherein search results located near the device's reported location are preferred over other results. Such techniques may be used to return the names of restaurants around a user, such as when the user submits "Italian restaurants" as a query on her mobile device.

SUMMARY

This document describes techniques, methods, systems, and mechanisms for performing location-based searching. In general, without a user of a mobile device having to enter an explicit search query (e.g., by typing or speaking the query), a mobile computing device may display content that corresponds to a search result. The search result may have been selected by a search engine as responsive to a query for a search area, where the search area was selected based on a geographical location of the mobile computing device. The search area may be selected from among several search areas that correspond to the geographical location. The several areas can be geographically nested within each other and may be regions that all include the geographical location. The search results may be generated automatically by a user powering on their device, by the user launching a browser on their device, by a user selecting a "search" button without defining a query, or in other similar manners.

In some examples, the display of search result content is provided on a web page, and where user selection of the content may cause the mobile computing device to display additional content that corresponds to the search result (e.g., by navigating to a different web page). The web page may not include content for other search results. Further, the web page may include an indication of the search area that was used to select the search result.

A user may provide user input to change the selected search area. Changing the selected search area may cause the search engine to determine a new search result, and the computing device to display content for the new search result. The web page may further include a display of a search box for defining a textual search query, and an interface element for submitting the query. User-input that changes the search area may be used to modify a score for each of the search areas, where the score is used in the selection of the search area from the several search areas.

In some examples, the same or a different web page includes a search box for defining a textual search query, and an interface element for submitting the query. User selection of the interface element for submitting the query, when a user has not defined a query in the search box, may cause the computing device to navigate to a web page that displays content for the selected search result.

Implementations described herein relate to a method of providing at least one result item based on a search area. The method includes receiving a request for a location-based search from a mobile device. The method further includes receiving a geographical location from a mobile device. Additionally, the method includes determining a search area based on the geographic location and a margin of error. Further, the method further includes determining the at least one result item based on the search area. Finally, the method further includes providing the at least one result item to a user in response to the search request.

According to another implementation, a system for providing at least one result item based on a search location is provided. A mobile search module is provided, and is configured to receive a request from a user. The mobile search module is further configured to receive a geographical location from a geographical location determiner module, and communicate the geographical location to a server. Further, the mobile search module is configured to receive at least one result item from the server based on a determined search area, the determined search area being based on the communicated geographic location. Finally, the mobile search module is configured to provide the at least one result item to the user using a display.

Particular implementations can be implemented, in certain instances, to realize one or more of the following advantages. A search result can be identified for a user based on a level of abstraction from a geographical location of the user's mobile computing device. Thus, the search result may be relevant to a general region. An indication of a search result that is relevant to a geographical region may be displayed on a web page as accompanying a text box for defining and submitting a search query. Thus, a user may be provided a suggested search result that is relevant to the user's location when the user goes to a web page to define and submit a search query. Also, a user may provide user input to submit a search query when a search query has not been defined. Such an "empty" submission of a search query may cause the computing device to display content for the suggested search query.

The details of one or more implementations are set forth in the accompanying drawings and the description below. Other features, objects, and advantages will be apparent from the description and drawings, and from the claims.

DESCRIPTION OF DRAWINGS

FIGS. 9A-9B are flowcharts of an exemplary computer-implemented method of providing at least one result item based on a search location.

Like reference symbols in the various drawings indicate like elements.

DETAILED DESCRIPTION

Figure 1:
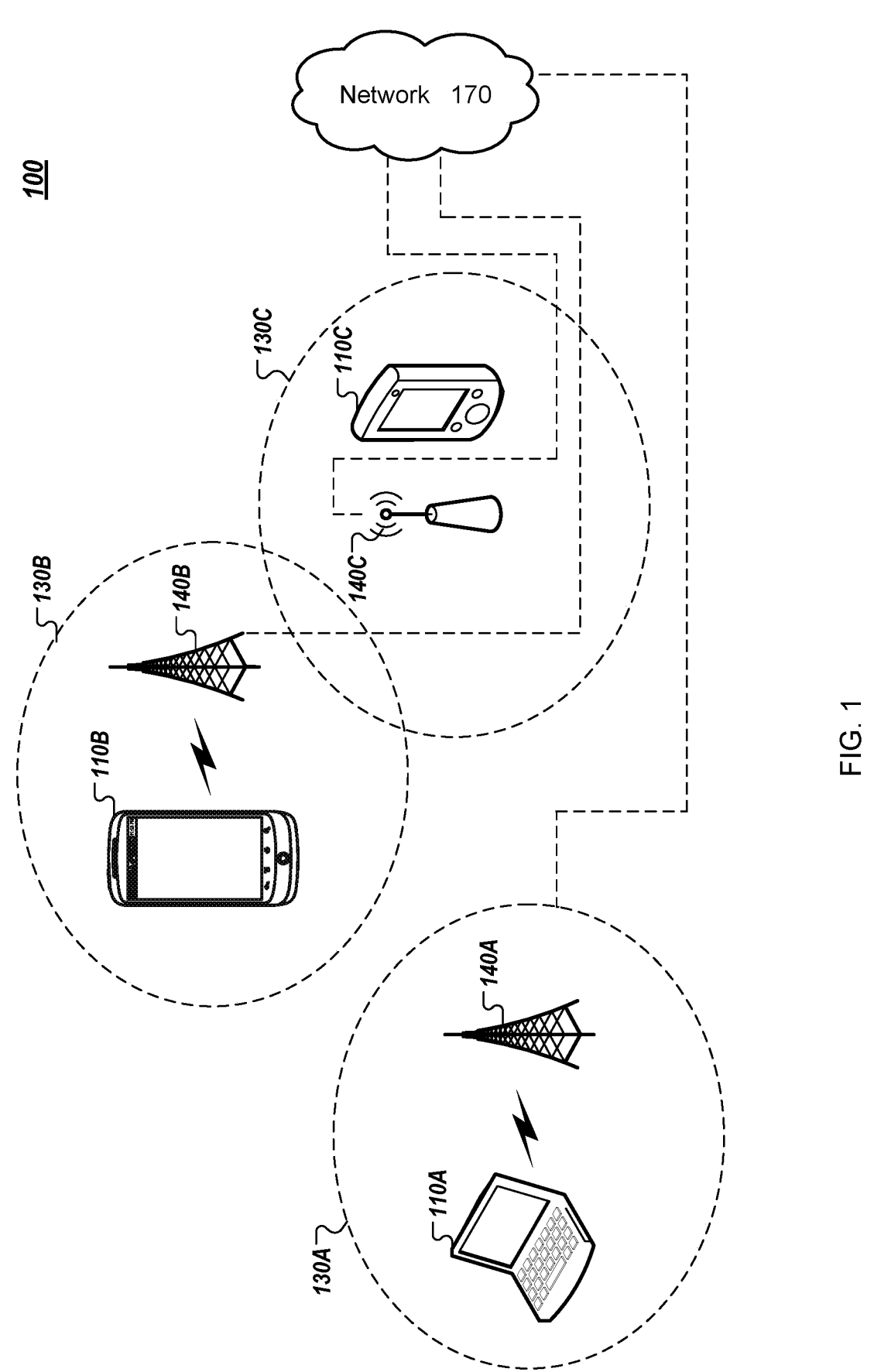
FIG. 1 is an architecture diagram of a network for providing a location-based search.

This document generally describes location-based searching. A mobile computing device may request that a server system provide content that corresponds to a geographical location of the computing device, and in response, receive such content for display. In various examples, the content is not provided in response to an explicit user input textual or voice query. For example, the content may be provided in response to a device entering a certain geographic area, a device being turned on, or on the device sensing a change in an physical area around the device (e.g., a microphone detecting that a sound around the device has changed, or an accelerometer detecting that the device or its user has changed modes, such as from immobile to walking).

The content may be selected for the mobile device based, indirectly, on the geographical location of the mobile device. For example, a search area that corresponds to the geographical location may be determined, and the determined search area may be provided to a search engine as part of a query. Content for a most-relevantly ranked search result that is responsive to the query may be returned to the mobile computing device for display.

In greater detail, an individual may use a mobile computing device, and the mobile computing device can determine an estimate of its own geographical location (hereinafter the device's "geographical location"). For example, the mobile computing device may determine a geographical location of the mobile computing device by identifying a nearby Wi-Fi router or cell-phone tower, or by triangulating signals from cell-phone towers or space-based navigational satellites. The mobile computing device may provide the geographical location to a server system, for example, as periodic location updates or with a request for search result content that is to be identified based on the geographical location (e.g., with a search query).

The server system may receive the geographical location and select one of several "search areas" that correspond to the geographical location. For example, search areas that correspond to the geographical location may be those search areas that include the geographical location, or that are geographically near to the geographical location. As a conceptual illustration, the geographical location may correspond to seven search areas that are geographically nested within each other like Russian nesting dolls. An example set of nested search areas include continent, country, state, county, city, neighborhood, shopping center, and store designators. Accordingly, every search area in a nested collection except for a "highest" level search area may spatially include a higher level search area, and every search area in the nested collection but a "lowest" level search area may spatially include a lower level search area.

A first search area may be completely geographically nested within a second search area. For example, no portion of the first search area may be outside of the second search area. A first search area may be partially geographically nested within a second search area. For example, a portion of the first search area may be outside of the second search area while a portion of the first search area may be inside of the second search area.

Because multiple search areas may correspond to the geographical location (e.g., because the geographical location is within each of the several search areas), various factors may be used to "score" each search area, and thus may be used in a selection of a most-relevantly scored search area. The various factors include an accuracy of the determined geographical location, and user interaction with search results that correspond to a search area (as described in more detail throughout this document).

While the estimated geographical location may be defined by geographical coordinates, the selected search area may identify a region that may be defined by a bounding set of geographical coordinates (e.g., a non-circular boundary of a city or a neighborhood defined by a dozen geographical coordinates).

The selected search area may be submitted to a search engine. The selected search area may be associated with human-language descriptive words. As an illustration, a search area for the city of San Francisco may be selected by a server system in response to the server system receiving from a mobile device coordinates that represent a location that is within San Francisco city or metropolitan area limits. Once the city of San Francisco has been selected as the search area (e.g., from a collection of search areas that includes "Bay Area" and "California"), the word "San Francisco" may be retrieved as being the human-language descriptive word for San Francisco.

In some examples, the descriptive words are submitted to a search engine instead of the geographical coordinates. For example, a search engine at the server system may receive the descriptive words "San Francisco" and perform a search using the words "San Francisco." In various examples, the search engine does not receive and does not use the geographical coordinates in the search. In various examples, the descriptive words are the only content of the search query. The search engine may be a same search engine that receives textual queries from users of the internet through a text box on a web page. Thus, the mobile computing device may perform a query by supplying coordinates (which are converted to a human-language query), and may receive one or more search results that may be the same as if the user had typed in the human-language query to the text box.

In various examples, the mobile computing device requests a search result automatically upon requesting resources for a specific web page. For example, a user may type in a Uniform Resource Identifier (URI) for a search engine website, and select a "Go" button. The computing device may transmit the request over the internet and receive in response resources for generating a display of the specific webpage. The specific web page may be configured to display an indication of a single search result that is associated with the geographic position of the mobile computing device. For example, the web page may be the web page that is displayed in FIG. 8, and the indication of the single search result may be graphical user interface element 810.

In various examples, the web page is rendered from executable code (e.g., JavaScript) that is for requesting an identification of the single search result. In other examples, the server system, upon receiving the request to supply resources for the web page, identifies the geographical location of the mobile computing device, determines the search area, determines a search result that is responsive to the search area, and provides the indication of the search result with resources for generating the display of the web page. Thus, the user may request a display of the webpage of FIG. 8, and the webpage may appear for display without the user supplying any user input to the mobile computing device subsequent to submission of the request for web page resources (e.g., a selection of the above-described "Go" button, or selection of a bookmark for the webpage).

In various examples, the web page may not be a web page that is displayed in response to a user-submission of a search engine query. In various examples, an indication of a single search result that is associated with the current location of the mobile computing device may be displayed in the webpage even though a user has not entered a textual or voice query. The query that is submitted to the search engine in such a situation may be based on the geographical location of the mobile computing device, and generated by the server system.

The search result may have been selected by a search engine from a repository of search results. In various examples, each of the search results in the repository identifies a web page that is hosted by an information service provider on the internet, and that was identified as a search result by a search engine crawler that traverses websites and identifies web site content. For example, the graphical interface element 810 identifies a "Century 16" movie theater. Selection of the graphical interface element 810 may cause the mobile computing device to navigate to a web page that is hosted and controlled by the movie theater company, and that is hosted on a domain of the movie theater company's choice.

In other examples, the repository of search results identifies web pages that are hosted by a single information provider. Each of the web pages in the collection may be similarly formatted, and may each identify a single place (e.g., each page may be a PLACE PAGE as described throughout this document). Thus, the single information provider may store a collection of web sites on hundreds, thousands, or even millions of geographical places.

In examples for which the repository identifies web pages that are hosted by a single information provider, the data that is stored for each web page may be structured to include content for each of several categories of information. For example, upon user selection of the graphical user interface element for the "Century 16" movie theater, a page that displays additional content for the Century 16 movie theater may be presented to the user. The page may include pictures of the movie theater, a map that identifies a location of the movie theater, a phone number and address of the movie theater, and user reviews for the movie theater.

Additionally, the page for the movie theater may display the search areas that correspond to a location of the movie theater. For example, the movie theater may be geographically located within the search areas "Mountain View, CA," "Bay Area," and "California." Thus, links to each of these search areas may appear within a display of the web page for the movie theater. User-selection of a graphical interface element for one of the relevant search areas may cause navigation to a display of content for the associated search area. For example, general information on the search area may be presented. In some examples, a web-site that is determined to be most-relevantly ranked for the selected search area may be displayed.

User-selection of a search area on the web page for the movie theater may be used to modify a prominence of the selected search area, or a prominence of the search area that was provided to the search engine to in order to identify the "Century 16" movie theater search result. For example, if a user of the mobile device selects the "Century 16" movie theater button 810, and then selects a link to view content corresponding to the "Bay Area," the selection of the link for the "Bay Area" may indicate displeasure with the selected search area, and the search result for the selected search area. Thus, the "Bay Area" search area may be weighted more heavily, and the "Mountain View, CA" search area may be weighted less heavily. The weighting may be for a geographical region around the mobile computing device, or may be based on a lowest level of which the geographical location of the mobile device corresponds (e.g., the Mountain View, CA search area).

Figure 8:
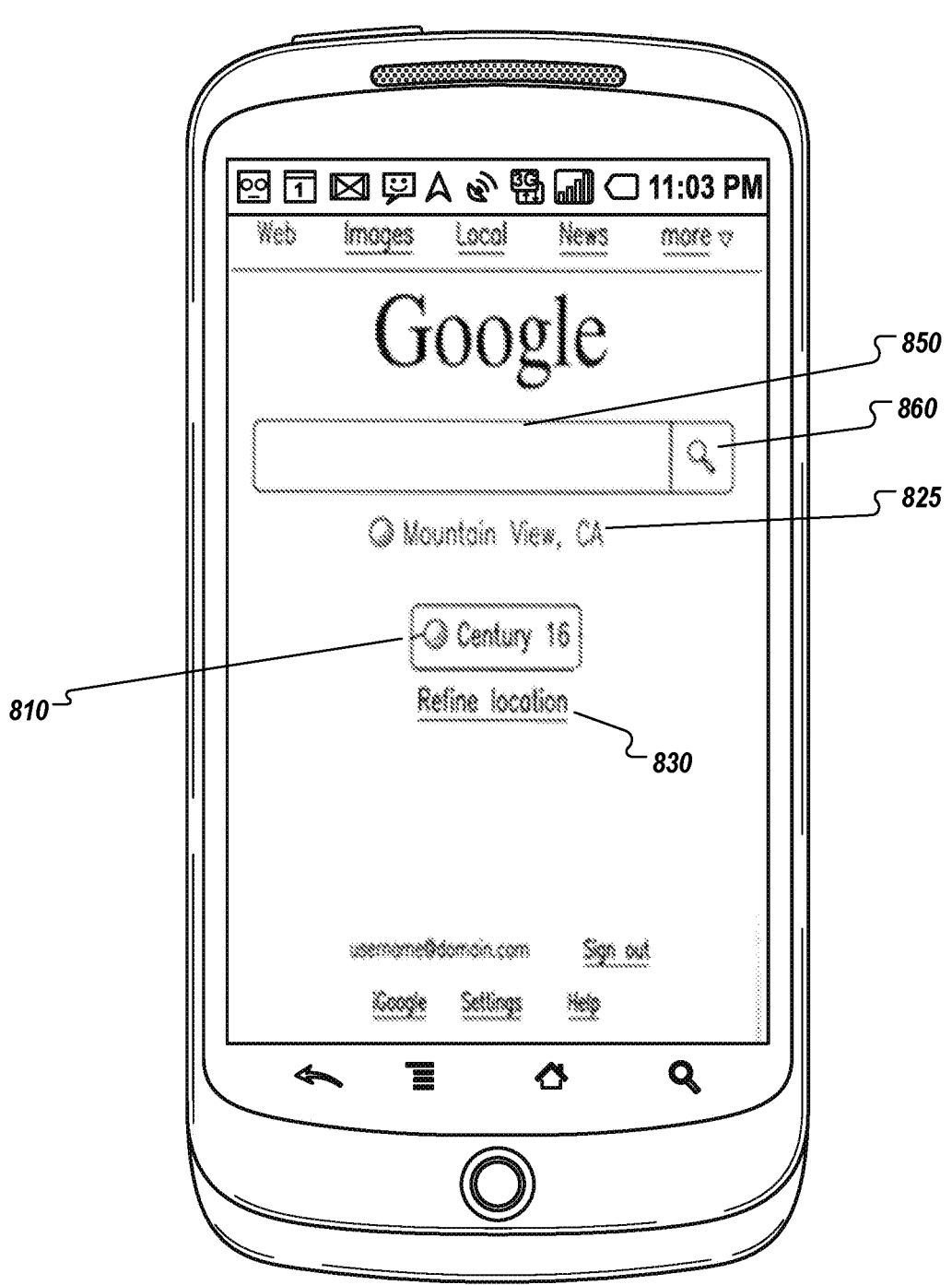
FIG. 8 is an example user interface.

The web page that is displayed in FIG. 8 may also include an interface element 825 that identifies the search area that was used to select the search result (e.g., the search result that is associated with the interface element 810). In other words, the web page displays an indication of the search area that was used to determine the search result. In various examples, a user may change the search area, for example, by selecting the "Refine Location" link 830 or by selecting the text that is displayed for the search area 825.

In response to selecting the "Refine Location" link 830, the user may be displayed a list of other search areas that correspond to a geographical location of the mobile computing device. In response to user selection of one of the other search areas, the search area text 825 may be updated to identify the newly selected search area, and the interface element 810 may be updated to display a new search result that is responsive to the newly selected search area.

In various examples, a server system maintains a statistical database of changes to search areas as a result of user input. A change from a first search area to a second search area may cause a weight for the second search area to be increased and a weight for the first search area to be decreased. The revised weight for either of the search areas may be general to all selections of the search area, or may be specific to selections of the search areas for a region that is associated with the determined geographical location from which the first search area was determined. The region that is associated with the determined geographical location may be a lowest-level search area to which the geographical location corresponds.

In some examples, the web page that would be displayed upon user selection of the interface element 810 may be displayed when a user selects a graphical interface element for submitting a query, when an associated query input text box hasn't received any user input. For example, should a user select the query submission graphical interface element 860 that appears next to the search engine query input text box 850, without having entered text into the query input text box 850, the mobile device may display a same page had the user simply selected the interface element 810.

In various examples, a user may select the query submission interface element 860 to cause navigation to a web page even though the web page that displays the query submission interface element 860 does not include any combination of the textual display of the search area 825, the interface element 810, and the link 830. In various examples and in response to selection of the query submission interface element 860, content identifying the determined search result is displayed in a box that drops down from the query input text box 850.

In various examples, the drop down box includes most-popular query suggestions for a present search area. In various examples, the drop down box includes a listing of the search results that are most-relevantly ranked for a present search area. In various examples, the drop down box includes a list of search areas that are relevant for the present location. User selection of a search area from the drop down box may cause the mobile device to navigate to a display of web pages that are relevant to the search area, or a single-most relevantly ranked web page for the search area.

In effect, selection of the query submission button 860 (or providing user input that would normally "submit" a user-entered query, but when there is no user entered query) may be considered an "I'm Feeling Lucky" button for a present location of the mobile computing device. A responsive display may be for a single website that is most highly ranked for the location of the mobile computing device (or a search area determined therefrom), or may be for a list of the responsive search results. In various examples, an "I'm Feeling Lucky" button for a present location of the mobile computing device need not be a query submission interface element.

In various examples, a web page may be a display that is generated by a client device using, at least in part, content that is received over a network connection from a remote computing device. A web page may or may not be rendered by a web browser. For example, a web page may be a display that is generated by an application program.

INTRODUCTION

Implementations of the methods and systems that are described in this document relate to location-based searching. This can include for example: determining a search area from a geographical location, searching for points of interest near the search area, refining a search and presenting the search results. While this document refers to illustrative implementations for particular applications, it should be understood that other implementations are contemplated.

Often a mobile user will be interested in knowing what points of interest are close to the current geographical location of the user. Such points of interest may be, for example and without limitation, restaurants, shops, businesses, parks, landmarks, and tourist sites. Further, a user may not be interested in points of interest that are immediately in their vicinity, rather, they may be interested in points close to, for example and without limitation, the particular shopping center, town, or city within which they are currently. Accordingly, an application that may provide this information to the mobile device of the user would be very useful to that user.

The following sections describe a system and method for performing a location-based search in greater detail.
System This section describes a system that allows a user of a mobile device to perform a location-based search. FIG. 1 illustrates a conceptual representation of cellular network 100. Network 100 includes various mobile devices 110A-C and wireless base stations 140A-C. Network 100 may be, for example, a GSM, TDMA or a CDMA technology enabled mobile network or any form of wireless network (e.g., IEEE 802.11, Bluetooth or other Wi-Fi networks) or a combination of wired and wireless networks. Although in the following description GSM networks are used as an example, it is to be noted that the description is not limited to GSM networks. Although three mobile devices and three wireless base stations are illustrated for exemplary purposes, network 100 may include any number of mobile devices and wireless base stations. Network 100 may be used to transmit and receive signals including but not limited to Wi-Fi, Bluetooth, or cellular signals. In an example, each device associated with network 100 may transmit and receive data (packets) according to a known protocol in a segment (channel) of an allotted portion of the spectrum (frequency band). For instance, the IEEE 802.11 series of protocols specifies the format of various types of packets which may be transmitted in preset channels of the spectrum, such as the ISM band located in the 2.4 GHz frequency range or the public safety band located in the 4.9 GHz frequency range.

Mobile devices 110A-C may include any device that is configured to exchange any form of data over a wireless network. Each mobile device 110A-C may communicate with wireless base stations 140A-C. Wireless base stations 140A-C may allow mobile devices 110A-C to communicate over network 100 or any other network connected to network 100. In an implementation, passive radio location technology may enable devices 110A-C users to determine their approximate location (e.g., metropolitan area, or latitude and longitude data) without Global Positioning System (GPS) capability, e.g., WiFi, Bluetooth, cellular signals. Passive radio location technology, in certain implementations, may avoid the so-called urban-canyon and inside-the-building problems that may prevent GPS technology from functioning.

Each wireless base station 140A-C may be a form of radio receiver or transmitter that serves as a hub of network 170. Each wireless base station 140A-C may also be the gateway between a wired network and network 100, or any other network and network 170. In an implementation, each wireless base station 140A-C may be a Wi-Fi router or any other form of wireless communication hub. In another example, wireless base stations 140A-C may be wireless routers that support one or more client devices, while some wireless base stations may act as signal repeaters. In coverage region 130A for example, mobile device 110A uses wireless base station 140A to send and receive data.

Figure 2:
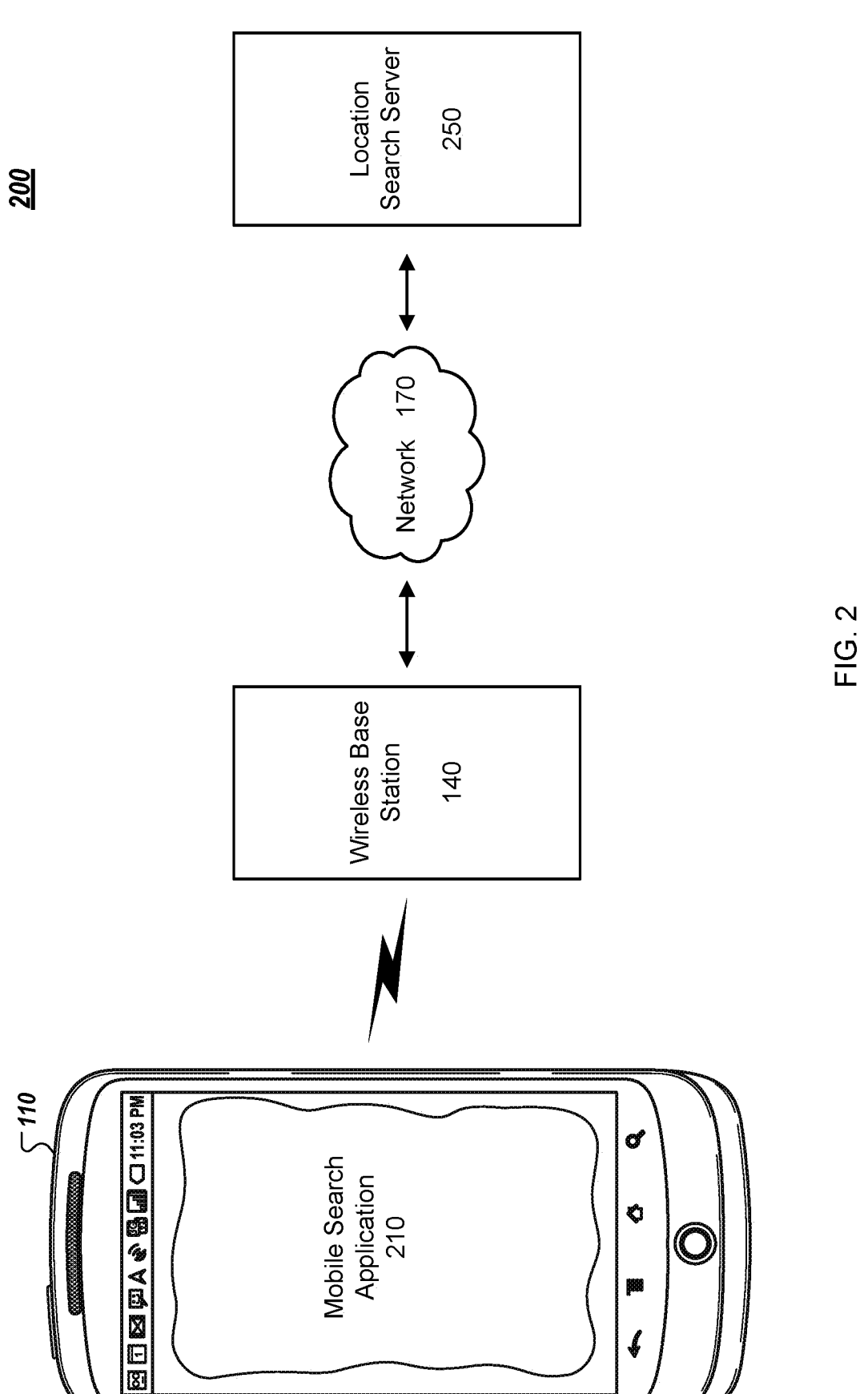
FIG. 2 is a more detailed diagram of the components of the system in FIG. 1.

FIG. 2 depicts wireless base station 140, as shown in FIG. 1, as wirelessly connected to mobile device 110. Location search server 250 is communicatively coupled to network 170. Location search server 250 may be implemented on one or more computing devices. Such computing devices may include, but are not limited to, a personal computer, a mobile device such as a workstation, mini-computer, clustered computer system, and an embedded system. Such computing devices may also include, but are not limited to, a device having one or more processors and memory for executing and storing instructions. Such a computing device may include software, firmware, and hardware. Software may include one or more applications and an operating system. Hardware can include, but is not limited to, a processor, memory and graphical user interface display. As discussed in descriptions of FIG. 10 below, the implementations described herein may be implemented using hardware, software or a combination thereof and may be implemented in a computer system or other processing system.

Location search server 250 may include a web server or may be coupled to communicate with a web server at the same or a different location. A web server may be a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, audio, multimedia features, or any combination thereof. Computer implementations of described implementations will be discussed further in the description of FIG. 10.

Figure 3A:
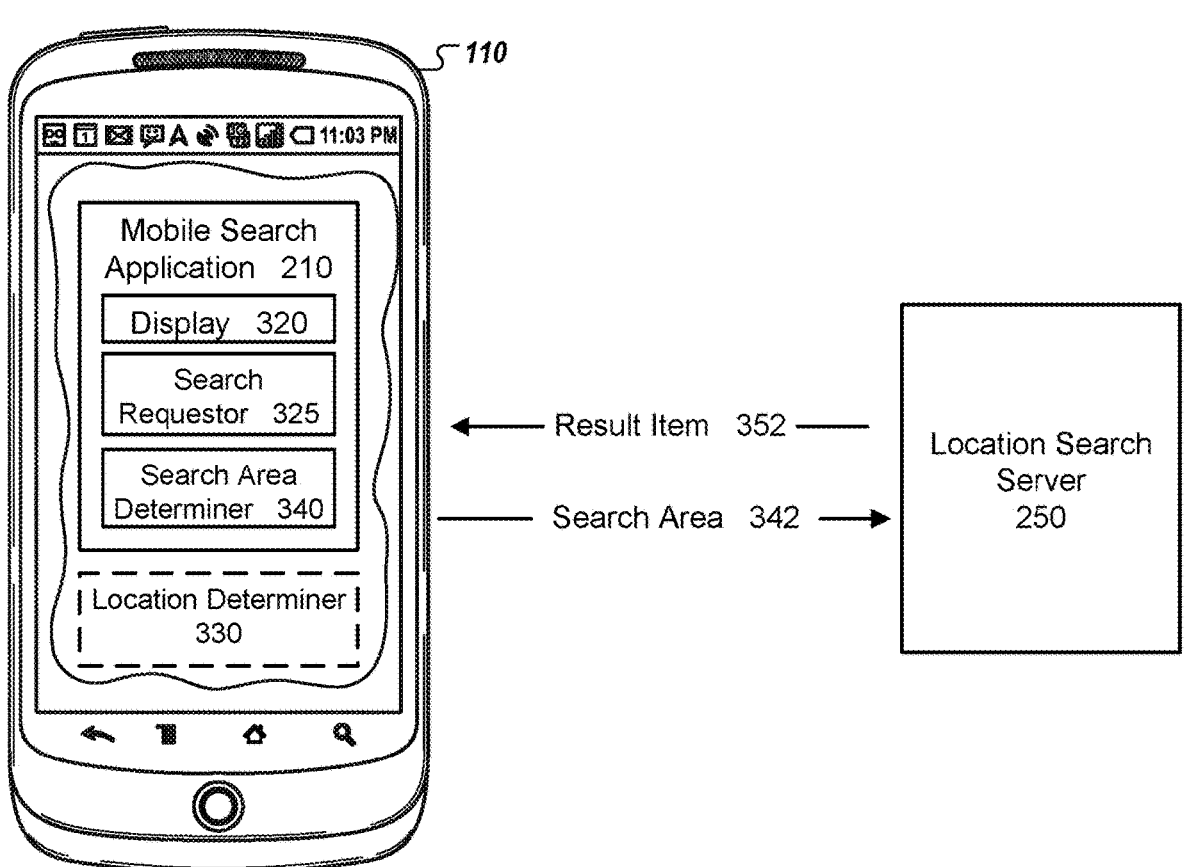
FIG. 3A-C are diagrams that display how components of the system in FIG. 2 may interoperate.

FIG. 3A is an architecture diagram of a system 300 for allowing a user to perform a location-based search. Broadly speaking, in implementations described herein, a mobile device 110 first determines a geographical location, a "search area" is then determined based on this location. As discussed further below, a geographical location may be an estimate of a physical location as specified by, for example, a latitude and longitude combination, or an address. Other types of physical location specifications may be used.

The diagram of FIG. 3A is a more detailed diagram of several of the components of systems 100 and 200 shown in FIGS. 1 and 2, according to an implementation that performs a location-based search. According to an implementation, FIG. 3A depicts mobile device 110 and location search server 250, mobile device 110 including mobile search application 210 and location determiner 330. In the implementation shown in FIG. 3A, mobile search application 210 includes a display 320, a search requester 325 and a search area determiner 340. In implementations shown in FIG. 3A, mobile device 110 transfers a search area 342 to location search server 250, and receives back result item 352.

Broadly speaking, as described below, in implementations described herein, as shown in FIG. 3A, location determiner 330 determines a geographical location of mobile device 110, and transfers this determined location to search area determiner 340. Search area determiner 340 follows various techniques, described below for different implementations, to determine a search area based on the geographical area. Implementations then use the determined search area 342 to form part of a query submitted to location search server 250. In implementations, location search server 250 then returns result item 352 based on search area 342. As used herein, result item 352 may include at least one result item, and these may be listed by implementations on display 320 after receipt. Also, as used herein, result item 352 may include a variety of different items of information, as discussed below.

Figure 3B:
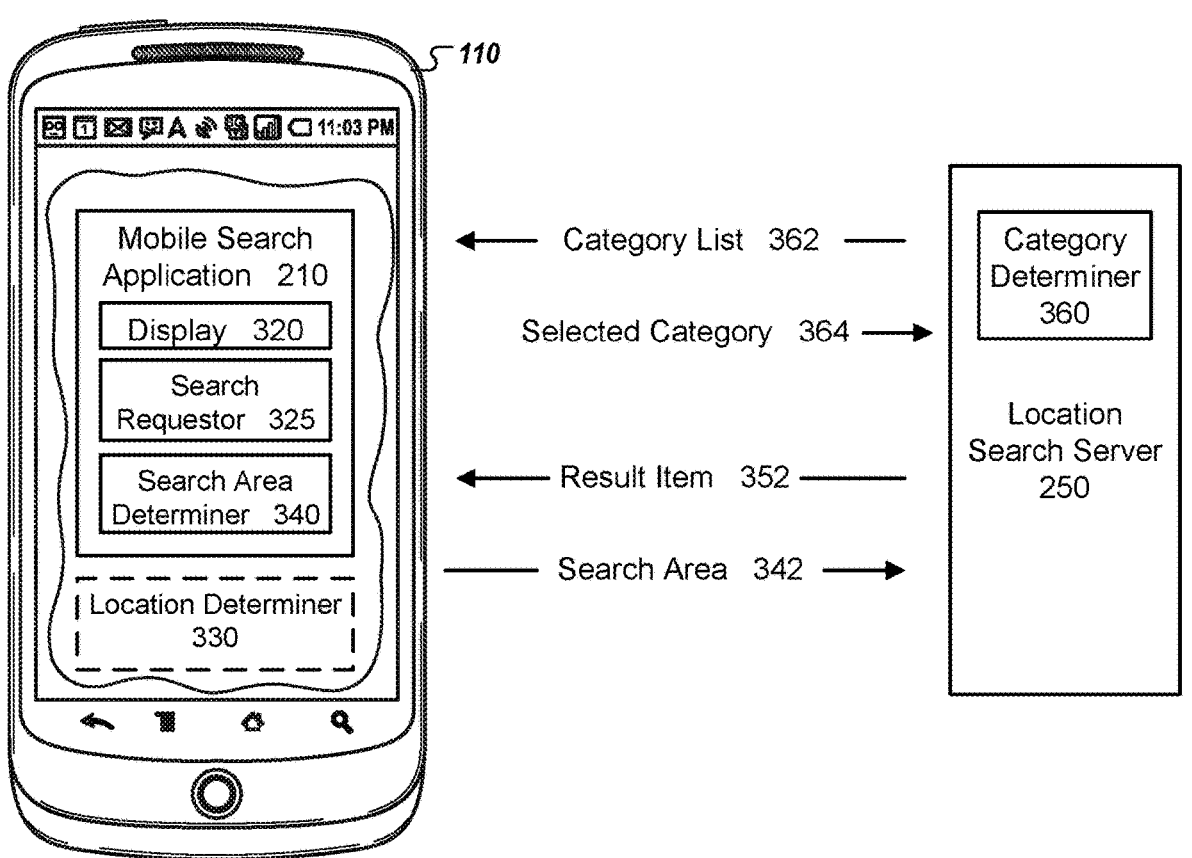

The FIG. 3B diagram is an additional implementation of the components of systems 100 and 200 shown in FIGS. 1 and 2 that perform a location-based search. According to an implementation, FIG. 3B depicts mobile device 110, and location search server 250, mobile device 110 including mobile search application 210 and location determiner 330. In the implementation shown in FIG. 3B, mobile search application 210 includes, a display 320, search area determiner 340, and a search requester 325, and location search server 250 includes a category determiner 360. As shown herein, components depicted as included on a particular device, e.g., mobile device 110 and location search server 250, may generally be placed on either device, given the requirements of the application, even splitting execution of the function between the two devices. In the implementation shown in FIG. 3B, category determiner 360 is included on location search server 250. In one implementation (not shown), both mobile device 110 and location search server

250 each have a category determiner 360, and the function is split between the two, as needed. In another implementation (not shown), category determiner 360 is included in mobile search application 210 on mobile device 110.

Broadly speaking, as further described below, in implementations described in FIG. 3B, location determiner 330 determines a geographical location of mobile device 110, and transfers a value corresponding to this determined geographical location 332 to search area determiner 340. As also shown in FIG. 3A, implementations then use the determined search area 342 to form part of a query submitted to a location search server 250. In the implementation of FIG. 3B, category determiner 360 determines a list of search categories in response to the received search area 342 value, and transfers back to mobile device 110 values corresponding to a category list 362. The generation of this category list 362 will be discussed further below.

After category list 362 is shown on display 320, in implementations, mobile device 110 allows a user to choose a particular category, and a value corresponding to this selected category 364 is transferred back to location search server 250. In implementations not shown, one or more selected categories may be listed as a default, and the user may be allowed to select the display of additional received category list 362 values. Implementations then use selected category 364 to form part of a query submitted to a location search server 250. In implementations, location search server 250 then returns result item 352 based on search area 342 and selected category 364, mobile search application 210 displaying result item 352 on display 320.

In another implementation (not shown), instead of transferring a value corresponding to selected category 364 to location search server 250, selected category 364 is used to filter result items 352 that were already transferred with the category list 362. This filtered list of search items may be immediately displayed after the category is selected.

Figure 3C:
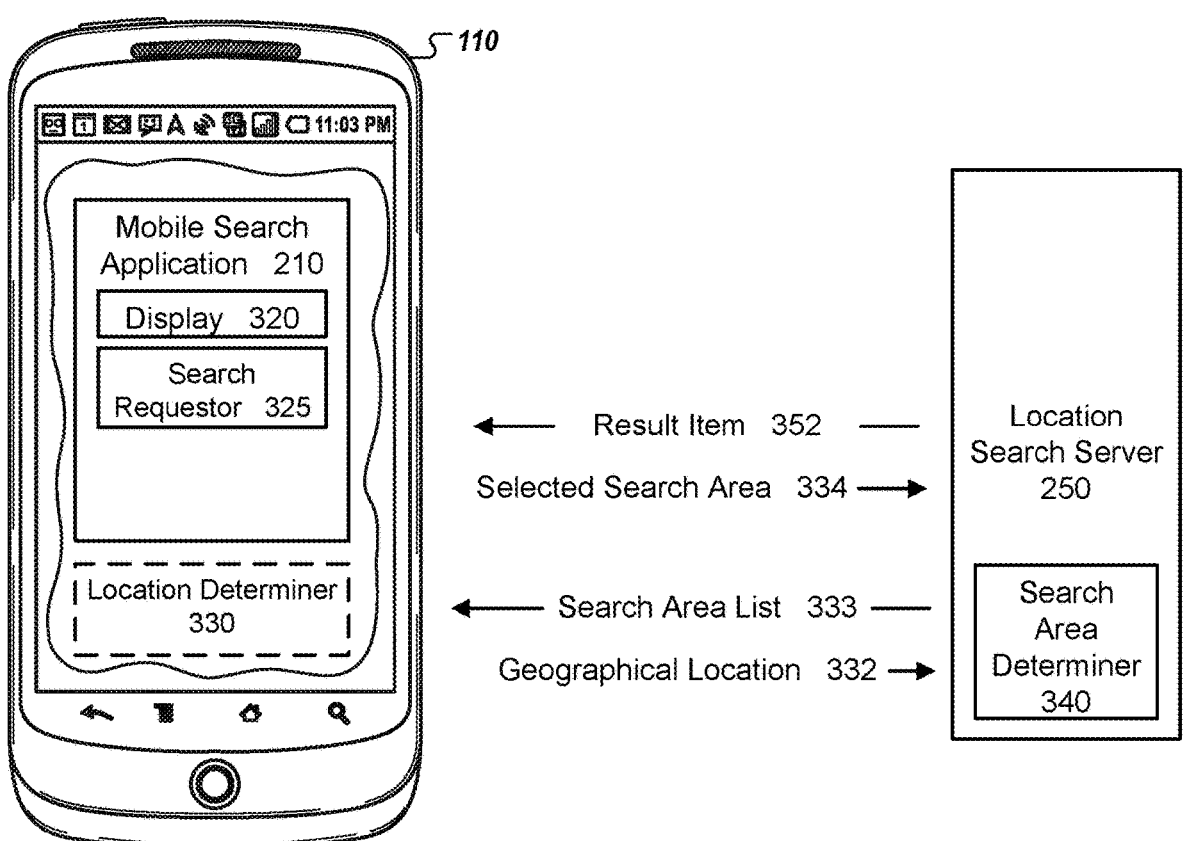

FIG. 3C is another more detailed implementation of the components of systems 100 and 200, shown in FIGS. 1 and 2, that perform a location-based search. According to an implementation, FIG. 3C depicts mobile device 110 and location search server 250, mobile device 110 including mobile search application 210 and location determiner 330. In the implementation shown in FIG. 3C, mobile search application 210 includes display 320 and search requester 325, and location search server 250 includes search area determiner 340. As shown herein, components depicted as included on a particular device, e.g., mobile device 110 and location search server 250, may generally be placed on either device, given the requirements of the application, even splitting execution of the function between the two devices. In the implementation shown in FIG. 3C, search area determiner 340 is included on location search server 250. In another implementation (not shown), both mobile device 110 and location search server 250 each have search area determiner 340, and the function is split between the two, as needed.

Broadly speaking, as described below, in implementations described in FIG. 3C, location determiner 330 determines a geographical location 332 of mobile device 110, and transfers a value corresponding to this determined geographical location 332 to search area determiner 340 on location search server 250. In this implementation, search area determiner 340 determines potential search areas based on geographical location 332, and transfers back to mobile device 110 values corresponding to a search area list 333. After displaying search area list 333 on display 320, mobile device 110 allows the user to choose a particular search area, and a value corresponding to this selected search area 334 is transferred back to location search server 250. As shown in FIG. 3C, the most likely search area may be set for the user as a default, and the user may be allowed to change the search area to one of the received values listed in search area list 333. Implementations then use selected search area 334 to form part of a query submitted to location search server 250. Location search server 250 then returns result item 352, mobile search application 210 displaying result item 352 on display 320.

Location Determiner 330

Location determiner 330 may determine a geographical location in a variety of ways. Implementations of location determiner 330 use location estimation readings from the wireless device. Such location estimation readings may be obtained by GPS if mobile device 110 has GPS support, or by passive radio location. Geographical location may also be estimated using location information specific to a mobile application-such a center of the view of a map or navigation application as it is being used or other like data. As is discussed with respect to FIG. 5, depending upon the method used for geographical location determination, a different margin of error may result. This margin of error may be used by implementations to affect the operation of the system.

Search Area Determiner 340

Figure 4:
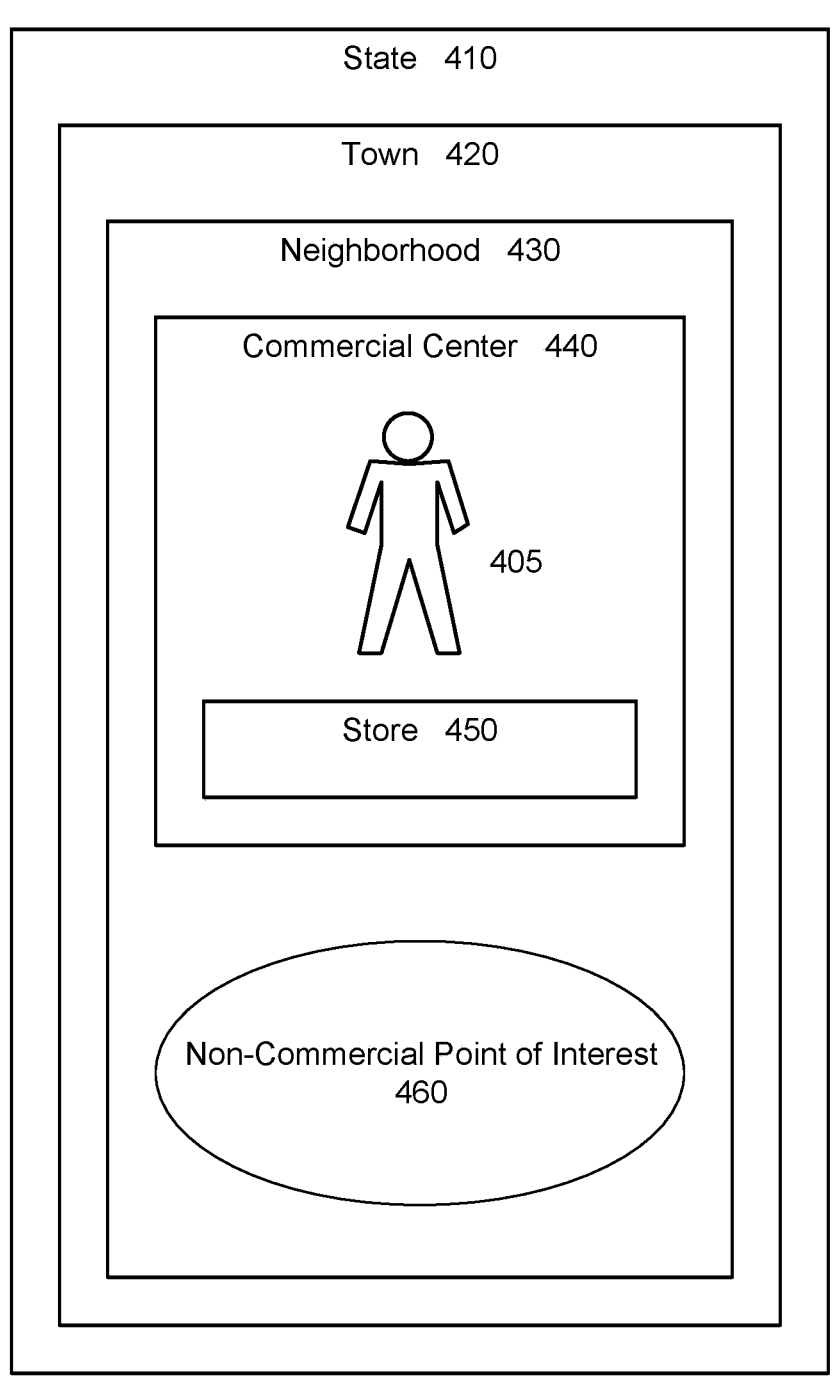
FIG. 4 is a diagram showing a user and different search areas.

As depicted in FIG. 4, a geographical location may be characterized in a variety of ways. In some implementations described herein, "search area" refers to a level of abstraction corresponding to the searching user's geographical location. For example, in FIG. 4, user 405 is directly outside store 450, such store being located in commercial center 440, neighborhood 430, town 420 and state 410. Commercial center 440 is also proximate to a non-commercial point of interest, a state park. Each one of the terms 450, 440, 430, 420, and 410 correspond to sample levels of abstraction, or search areas. In other implementations (not shown), the search area may be a level of granularity determined, e.g., measured in distance from the determined geographical location. In other implementations, search area may be a combination of both the abstraction and granularity concepts.

Search area determiner 340 can use the determined geographical location and use mapping resources to determine corresponding search areas 342. For example, GOOGLE MAPS can return various search areas that correspond to a geographical location. Other techniques are also available for determining different search areas from a given geographical location.

Allowing a geographical location to be characterized as a search area before a search may promote the provision of useful location-based search results to a user. For example, the physical position of user 405 may be outside of a particular electronics store 450, in commercial center 440. Based on this geographical location, two different example useful results may be generated in response to a location-based search:

Result 1: A result item that links to store's 450 web site.

Result 2: A result that lists the other stores in commercial center 440.

Different result items, such as those shown above, may be given based on the selected search area of the user. If the search area is set to the electronics store 450, then result 1 would likely be a selected result item, and if the search area is set to the shopping center 440, then result 2 would likely be the selected result item. By separating the concepts of search area and geographical area, implementations described herein allow users to better target their location-based search results.

In implementations, the "area" in which a search will be performed may be done using additional levels of scale and description. For example:

A1: In a particular supermarket, e.g., "Food Land."

A2: In a particular commercial center, e.g., a shopping plaza, e.g., "Culmore Plaza."

A3: In a particular neighborhood, e.g., "Lakeside."

A4: In a particular "part of town," e.g., the "West End."

A5: In a particular city, e.g., "Fairfax, VA."

A6: A region, e.g., the Mid-Atlantic Region.

All of the above search area characterizations may include a single geographical location. These examples A1-A6 are illustrative and not intended to be limiting. Other search area characterizations may be utilized.

Once potential search area characterizations for a particular geographical area have been identified, implementations may set a search area for a location-search in variety of ways. As discussed above, with respect to FIGS. 3A-C, in implementations, search areas may be automatically determined, selected by the user or using a combination of these approaches.

Figure 5:
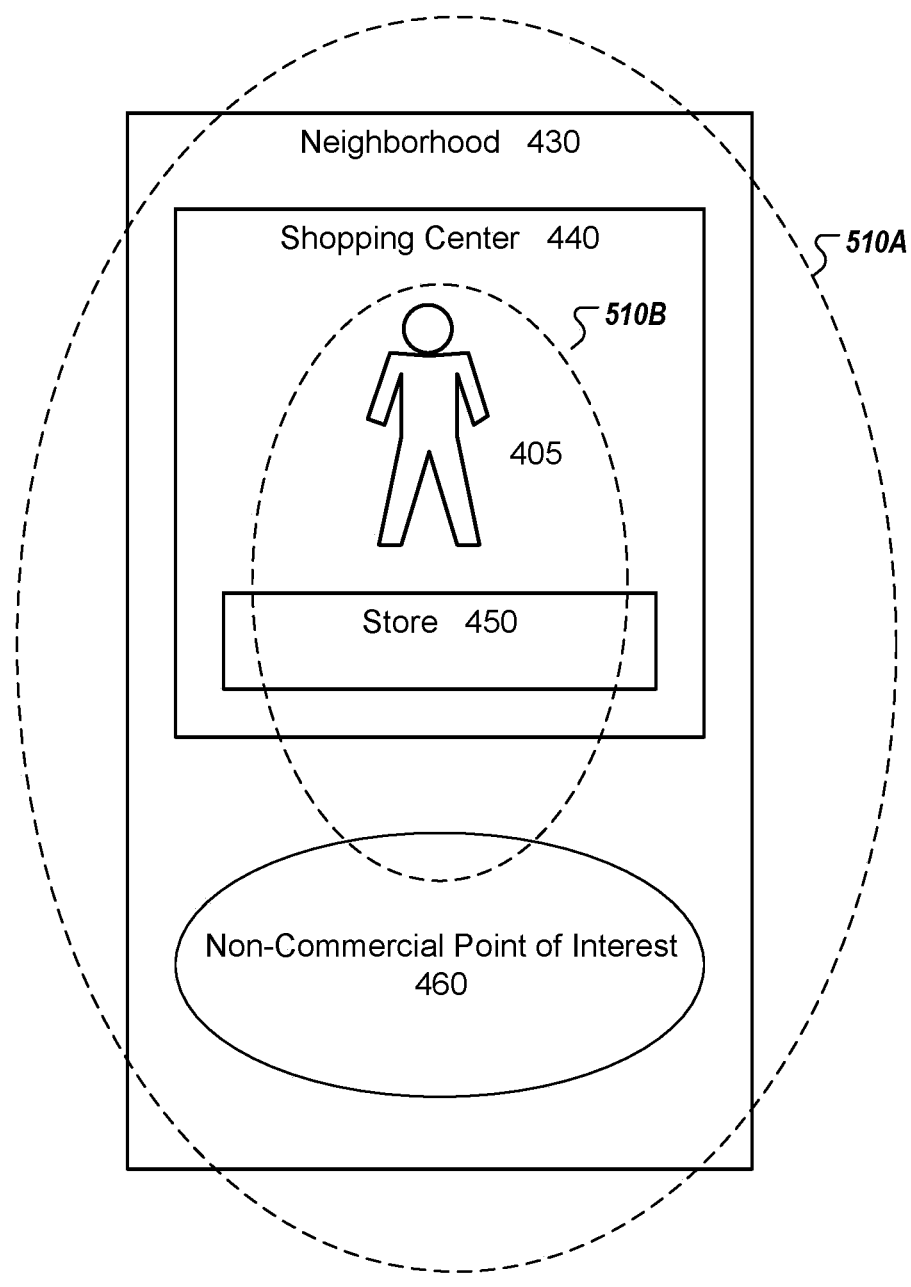
FIG. 5 is a diagram showing a user, different search areas, and the margins of error of geographical location estimates.

As shown in FIG. 5, implementations may use a margin of error, either predetermined or derived, to assist in the selection of a particular search area. For example, if a particular geographical location determination shows an individual is standing in a supermarket, but the margin of error 510A is set to one half-mile, a neighborhood level search area may be selected, or in another implementation, the search area may be set to a half-mile granularity. Alternatively, if a relatively small margin of error 510B, such as 500 feet is set, a search area comprising the store 450 may be used.

As discussed with FIG. 3C above, another technique used by implementations for refining search area is to allow the user, after geographical location is estimated, but before a search is performed, to select from a determined search area list 333. For example, the list of A1-A6 above may be presented to the user, and the user may select from the search area most appropriate to the search that they desire to execute. In the alternative, additional implementations may use criteria to select the "best" search area for a particular user or search. As is discussed in conjunction with FIG. 8 below, the user may be allowed to display the list and select a different search area.

A variation on the user-selected search area selection described above includes allowing the user to specify a preference for a particular search area level for all performed location searches, e.g., for all searches, show the neighborhood level search area.

Location Search Server 250

Implementations of location search server 250 receive requests for search, values corresponding to search areas, and values corresponding to categories, and produce one or more result items in response to these inputs. Result items may be selected by location search server 250 in a variety of ways. Some implementations can combine known search item selection techniques, e.g., popularity, and relevance, with concepts disclosed herein, such as search area. Example result selection factors include:

S1. The most relevant result items for a given search area.

S2. The most popular result items for a given search area.

S3. The result item closest in proximity to a given search area, based on different methods of travel, e.g., walking, traveling by automobile, and biking. The methods considered may vary based on the characteristics of the search area, e.g., automobile travel may not be possible for locations inside a shopping mall search area.

S4. The result item that matches a user profile of result item preferences.

S5. The time of day of the search. Different implementations may consider time of day along with other factors, including search area, to select search results. For example, a user executing a location-based search at 5PM may be provided with search results that highlight taxicabs and restaurants, because these are common results desired at this time.

S6. Previous searches executed by a same user. Different implementations may consider the search history of the user. For example, if a user, on a previous search, selects a search result for a particular restaurant, and the user later executes a location-based search when proximate to the restaurant, this result could be promoted in the location-based search.

S7. Other data applications used by the user. Different implementations may utilize information stored in other accessible applications. For example, if a user is storing appointments in a calendaring application, such as GOOGLE CALENDAR by Google Inc., location search server 250 may access this information and use it to influence the selection of location-based search results. If, for example, a user executes a location-based search when the user is proximate to a location that is stored in a calendar appointment of the user, result items that relate to this location may be preferred.

All of the above examples are different ways to select result items. Implementations may use a combination of the techniques S1-S7 above to select result items. This example of features S1-S7 is illustrative, and other implementations may also be used where appropriate.

Result Item 352

As discussed above in relation to FIGS. 3A-3C, implementations may list, display and otherwise present a variety of different result items. Implementations of the location-based search described herein are enabled to at least return URLs in list form, URLs displayed as web pages without additional user input, and other standard search-engine result items.

The web pages displayed as result items may be traditional web pages selected, as described in the S1-S4 factors above, based on the search area combined with web search criteria. For example, a result item selected for a store-level search area may be the main web page for that store. In an example, a user visiting "Joe's Electronics" would be presented a result item of a URL to the "Joe's Electronics" web page. In a displayed list of result items, listed items for this example may also include reviews of particular products sold at Joe's, as well as a Better Business Bureau page with a warning about Joe's business practices.

Figure 6B:
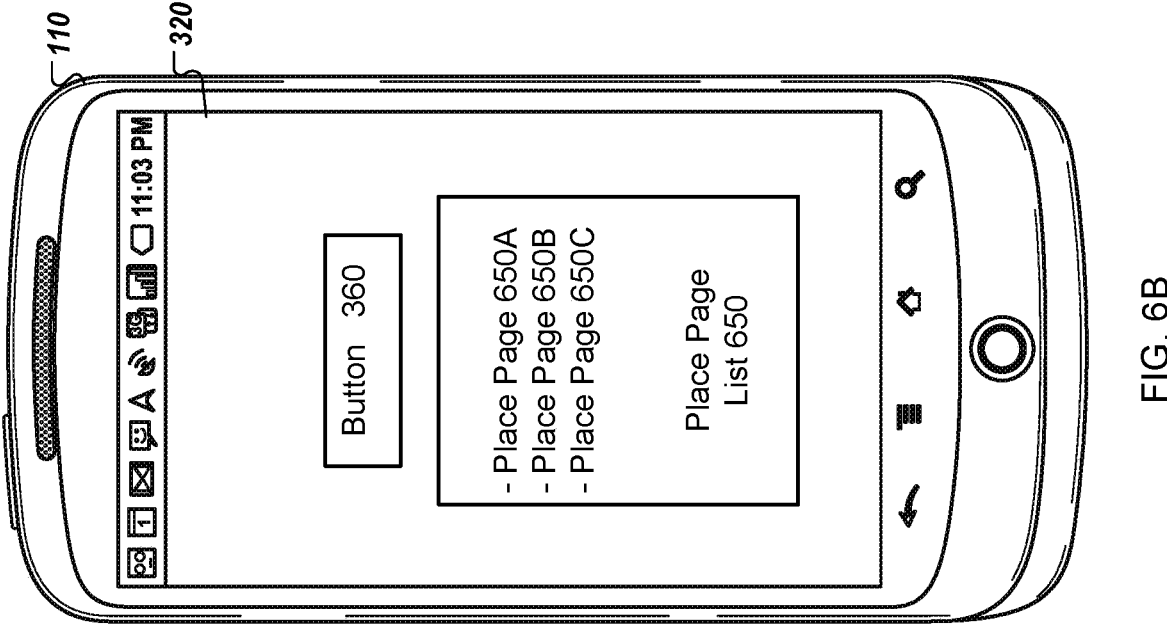
FIGS. 6A-F are example user interfaces.
Figure 6A:
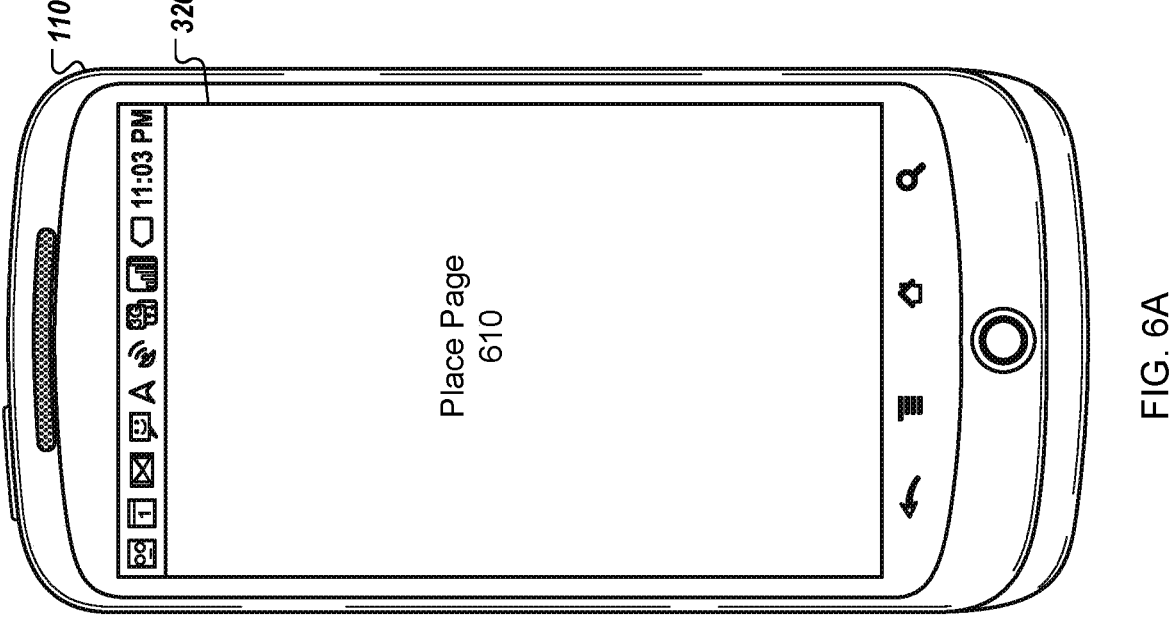

Implementations described herein also, as shown in FIG. 6A, may return a URL selected from a collection of unique URLs on a single domain, each URL in the collection of unique URLs describing a different geographical place, for example, a Google PLACE PAGE by Google Inc. The single URL displayed for a particular search area 610, e.g., an airport, may be a collection of information about a particular place, including web links to relevant URLs, descriptive information about the place, e.g., text description, maps, and pictures. PLACE PAGES as result items may be displayed by implementations, as in FIG. 6B, on a list, or as shown on FIG. 6C, they may be displayed as a single result, without additional user input.

Category Determiner 360

Figure 6D:
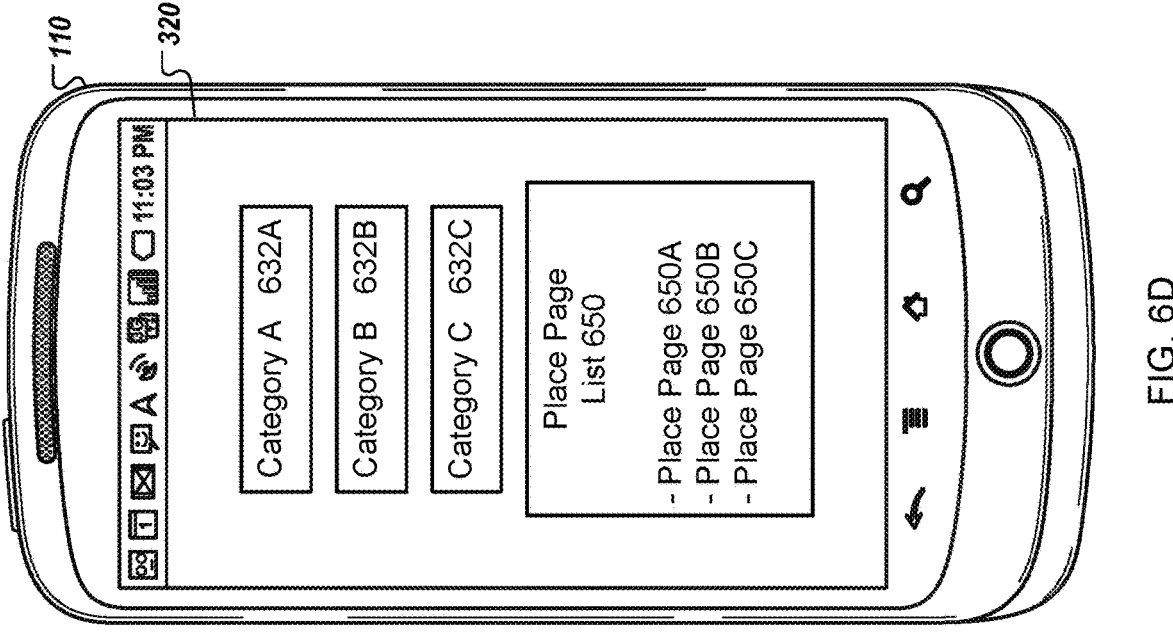
Figure 7A:
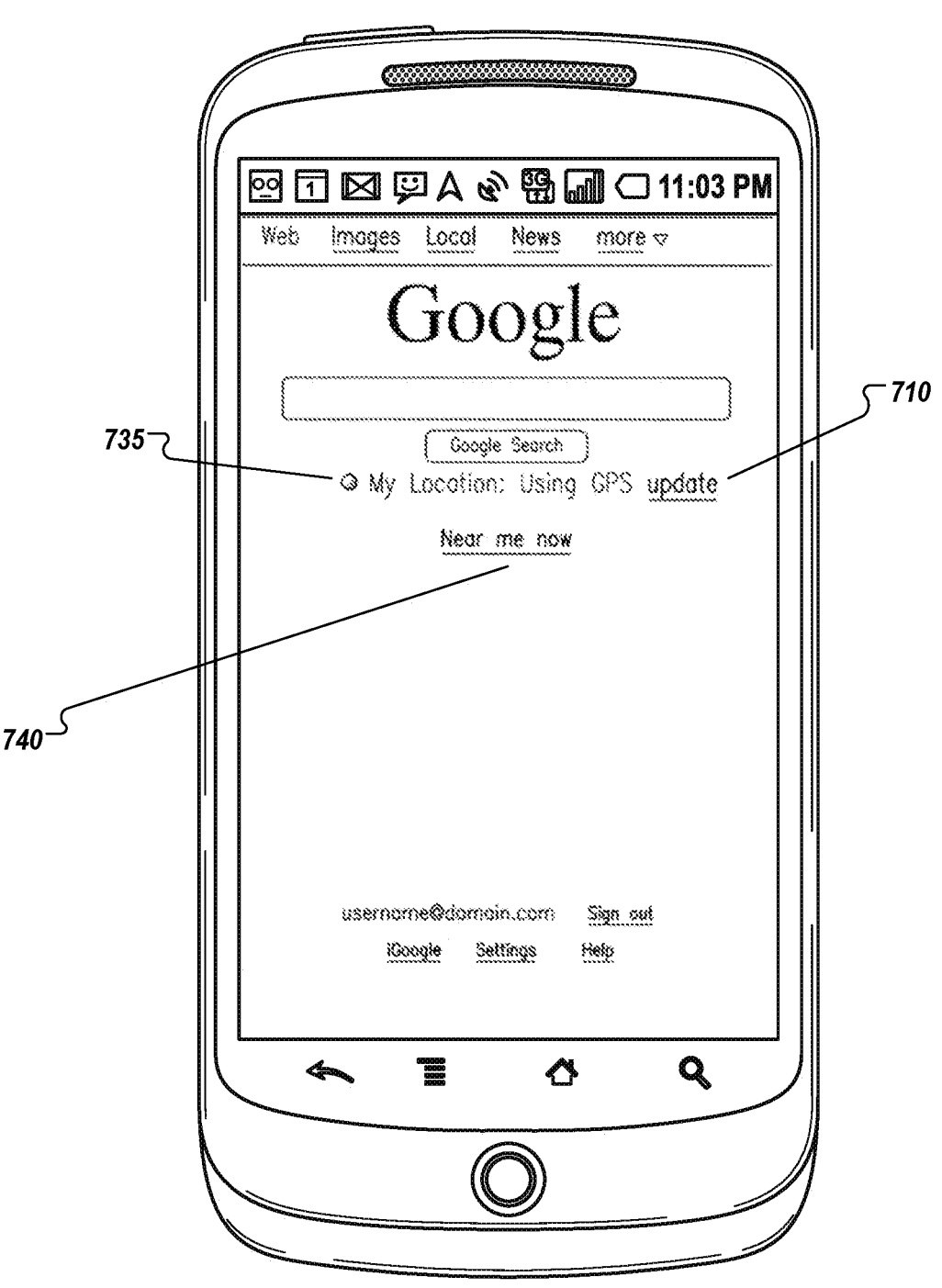
FIG. 7A-C are example user interfaces.
Figure 7B:
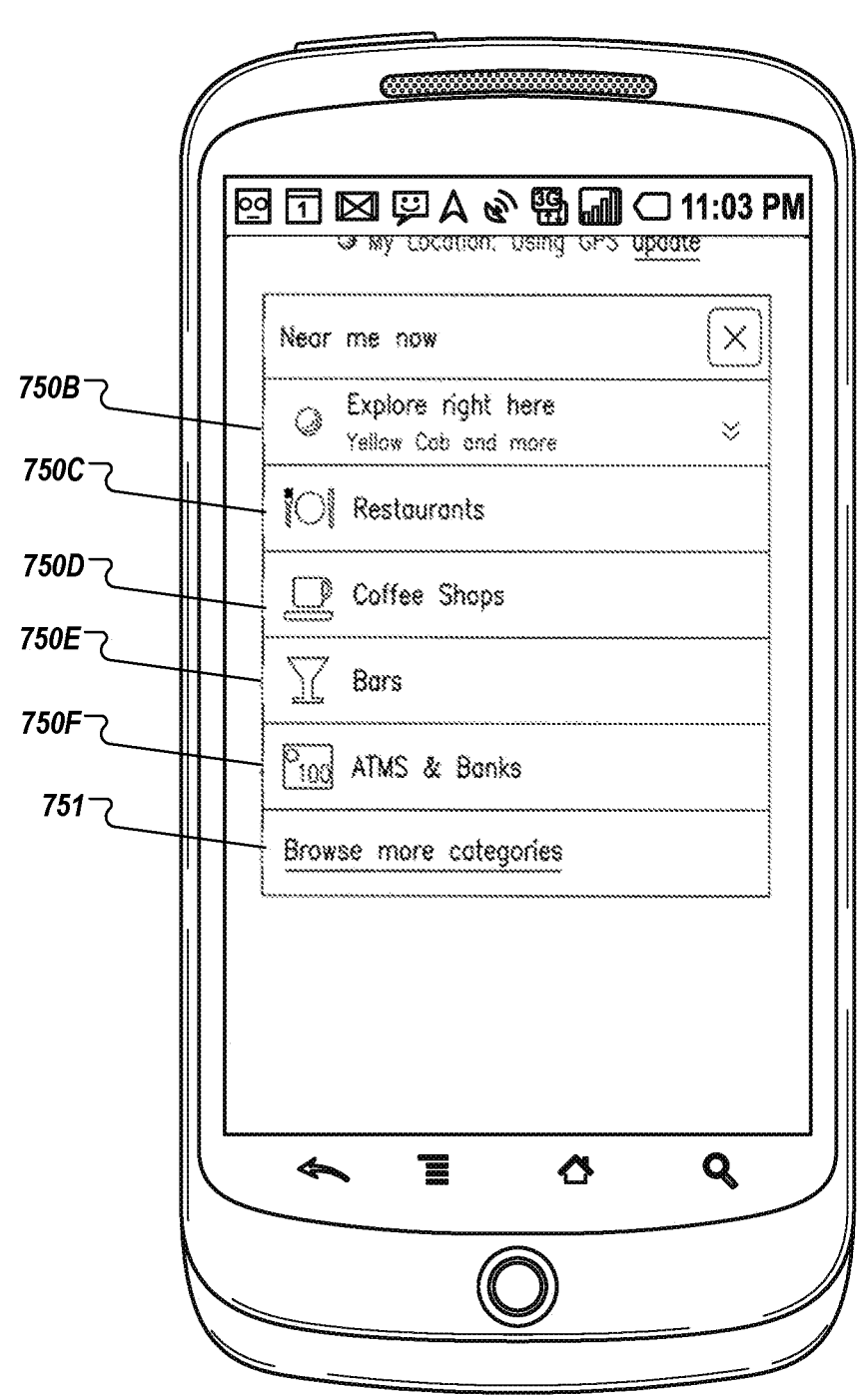

As shown in FIGS. 6D and 7B, and as discussed above in conjunction with FIG. 3C, implementations allow users to select from a list of categories of results to display (e.g., categories 632A, 632B, and 632C). As discussed above with respect to FIG. 3C, implementations generate lists of categories using category determiner 360. In implementations, this category list display and enablement of a user to select a category from the list, in implementations, comes after a search request, but before a display of a results list.

Implementations of category determiner 360 may generate the list of categories in a variety of ways:

C1. Based on a standard list of categories

C2. Based on a list configurable by the user

C3. Based on a received search area 342 or selected search area 334.

Implementations utilizing this approach look at the search area level of abstraction, and provide categories that are responsive. For example, referring to the search areas of FIG. 4, if user 405 selects a search area of store 450, then categories may be delivered that relate to the store and its products, e.g., types of products, information about the store, and other related information. Alternatively, if user 405 selected commercial center 440 as their search area, then categories may be delivered that relate to other shopping opportunities in the shopping center, maps, pictures and other related information. If the user selected non-commercial point of interest 460, e.g., a state park, then non-commercial categories surrounding recreation and park recreation may be presented, along with commercial categories for park gift shops and food.

C4. Based on the popularity of the categories among other similarly located users executing a similar search.

C5. The time of day of the search. Different implementations may consider time of day along with other factors, including search area, to select categories. For example, a user executing a location-based search at 5PM may be provided with categories that highlight taxicabs and restaurants, because these are common results desired at this time.

These examples of category generation approaches C1-C5 are illustrative, and other implementations may use a combination of the techniques C1-C5 above to select categories, or may also use other such approaches.

In implementations, once a category is selected, a set of appropriate subcategories may be shown, or the user may be directed to the list of result items described below. Implementations displaying subcategories may be selected using variations of the category generation approaches C1-C5 enumerated above.

Display of Result Items

Figure 6C:
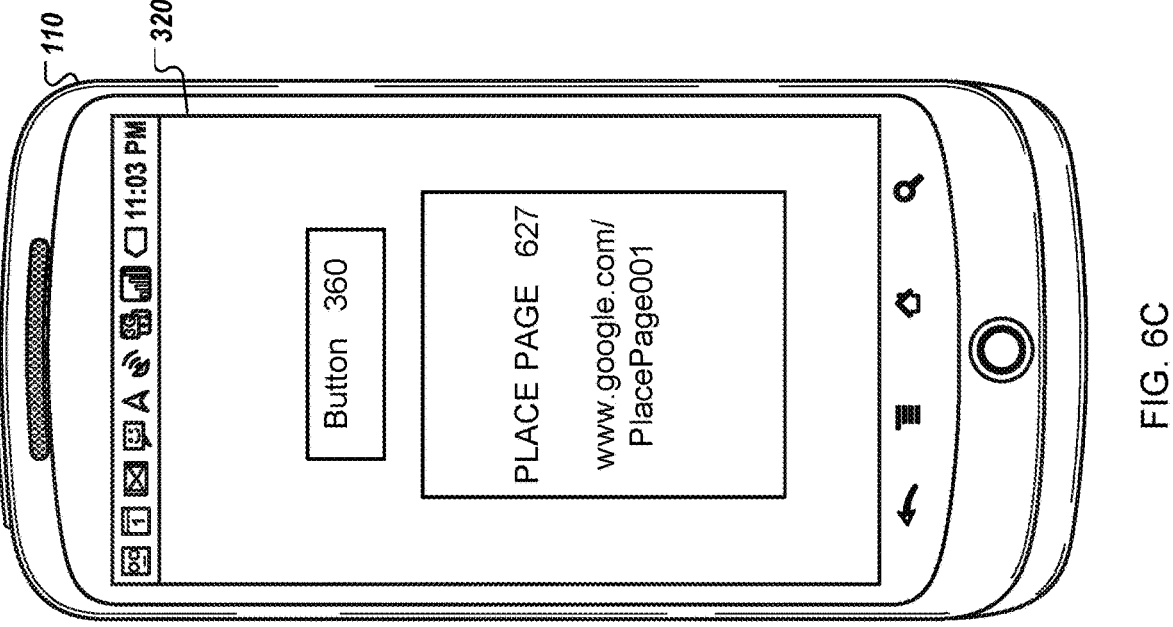
Figure 6F:
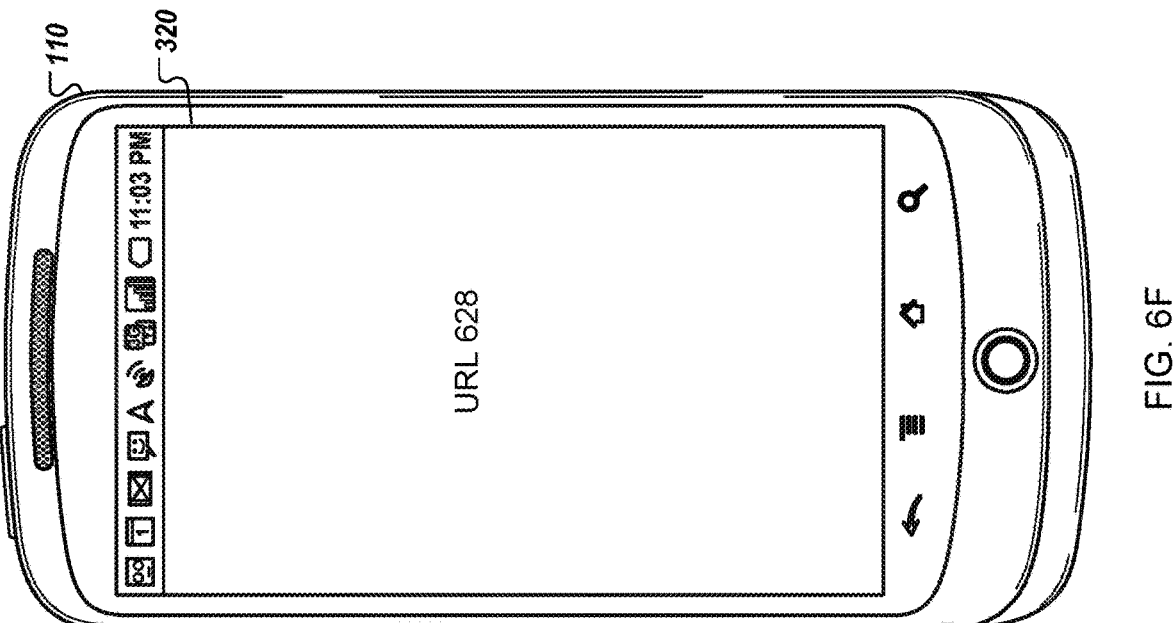
Figure 6E:
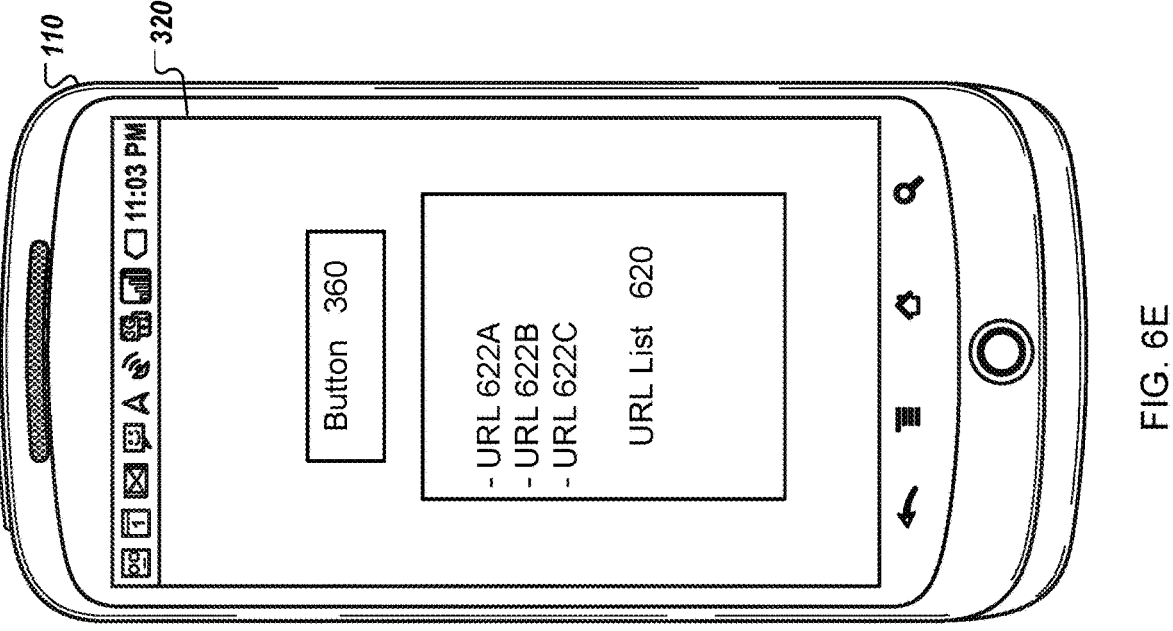

As shown in FIGS. 6B and 6E, implementations may immediately display a list of the results items discussed above, either PLACE PAGES 650A-C, or URLs 622A-C. Items may be ranked and filtered in a variety of ways, including by relevance, proximity, and estimated travel time.

As shown in FIGS. 6C and 6F, another approach used by implementations shows, immediately after a search, a visual display of a result item (e.g., Place Page 627 or URL 628) without additional user input, e.g., immediately after executing a search, the result item is displayed on the user display. An example search for implementations using this immediate display approach may have no information supplied by the user, e.g., search terms, only a search request, e.g., as manifested by selecting a search button. Implementations of this no user supplied information request are called a "binary request."

Exemplary Implementations

Figure 7C:
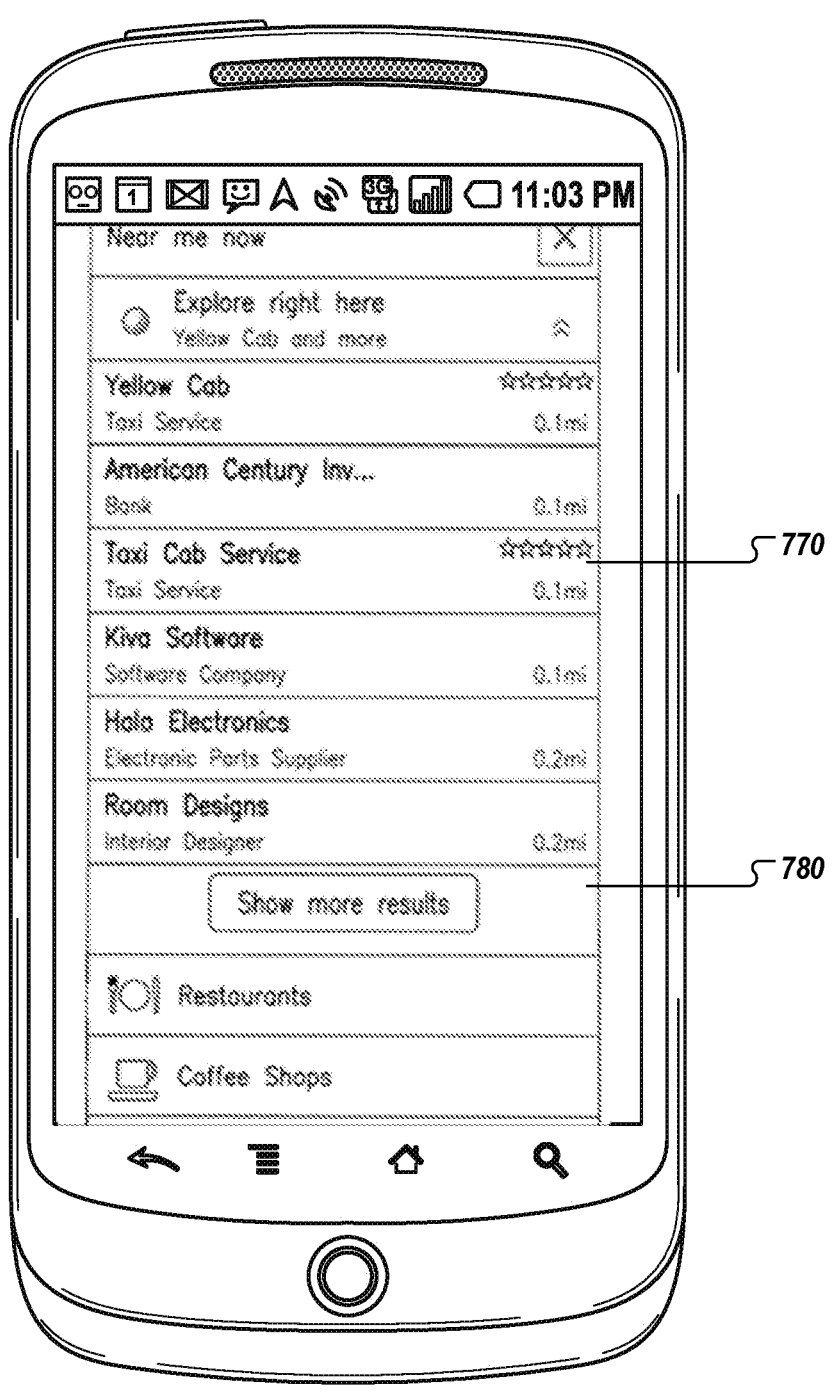

FIGS. 7A-C are examples of a mobile location-based search graphical user interfaces. In an example operation of an implementation using the GUI depicted in FIG. 7A, a user can request that location determiner 330 update the user's location, by pressing the update button 710 on the GUI. The application then requests an updated location from location determiner 330. Location determiner 330 then returns a geographical location, which then may be displayed on the GUI at 735. Alternatively, in an implementation described in the flowchart of FIG. 9B, location determiner 330 may automatically update the set geographical location without the above user request. In yet another implementation, the value displayed at 735 is a determined search area based on the geographical location.

The user then may press a GUI button 740 to request a search, this button 740 shown for example on FIG. 7A labeled "Near me now". As discussed above, different implementations will perform different steps at this point. One implementation, as shown in FIG. 7B, will proceed to display a list of categories generated by the processes described herein, and enable selection of a category by the user. Some implementations use such categories to select search results items. Some implementations, as shown on FIG. 7B will list the categories along with a button that allows for immediate display of uncategorized result item, e.g., a button 750B labeled "Explore right here." In implementations, clicking on button 750B will lead to the display shown on FIG. 7C. FIG. 7C further shows that a user may select a button 780, labeled "Show more results" to see additional search results. In implementations, for example, if button 770 is selected, then a URL descriptive of the selected item—"Taxi Cab Service"—may be displayed.

Instead of clicking on button 750B, in the implementation shown in FIG. 7B, a user may select a listed category, e.g., 750C-F, and results corresponding to this category will be listed. In implementations, a button 751, labeled "Browse more categories" will present additional categories to the user.

FIG. 8 is an example of a mobile location-based search GUI. The implementation shown on FIG. 8 differs from 7A in that, for example, value 825 shows the user's current geographical location, and an indicator 810 is dynamically labeled with a default, determined search area as discussed with respect to FIG. 3C above. In implementations, indicator 810 is shown to indicate to a user that a search area has been selected. In additional implementations, for example, either the shape or the color of indicator 810 may indicate to a user the margin of error, as discussed with respect to FIG. 5, that went into the determination of the search area. In other implementations, both the shape and the color of indicator 810 may convey information to the user.

As also discussed with respect to FIG. 3C above, in the implementation depicted in FIG. 8, a user may select "Refine location" link 830 and select from a list of other potential search areas, e.g., Century 16 Plaza, Barcroft Neighborhood, Falls Church, VA, or Washington D.C. Area. Also in this implementation, selecting button 810 causes the location-based search to execute, and similar steps to be performed as has been described with respect to FIGS. 7A-7C sections and elsewhere herein.

Method 900

This section describes a computer-implemented method of providing at least one result item based on a search location. FIGS. 9A-D are flowcharts of an exemplary method 900 for providing at least one result item based on a search location. While method 900 is described with respect to an implementation, method 900 is not meant to be limiting and may be used in other applications.

Figure 9A:
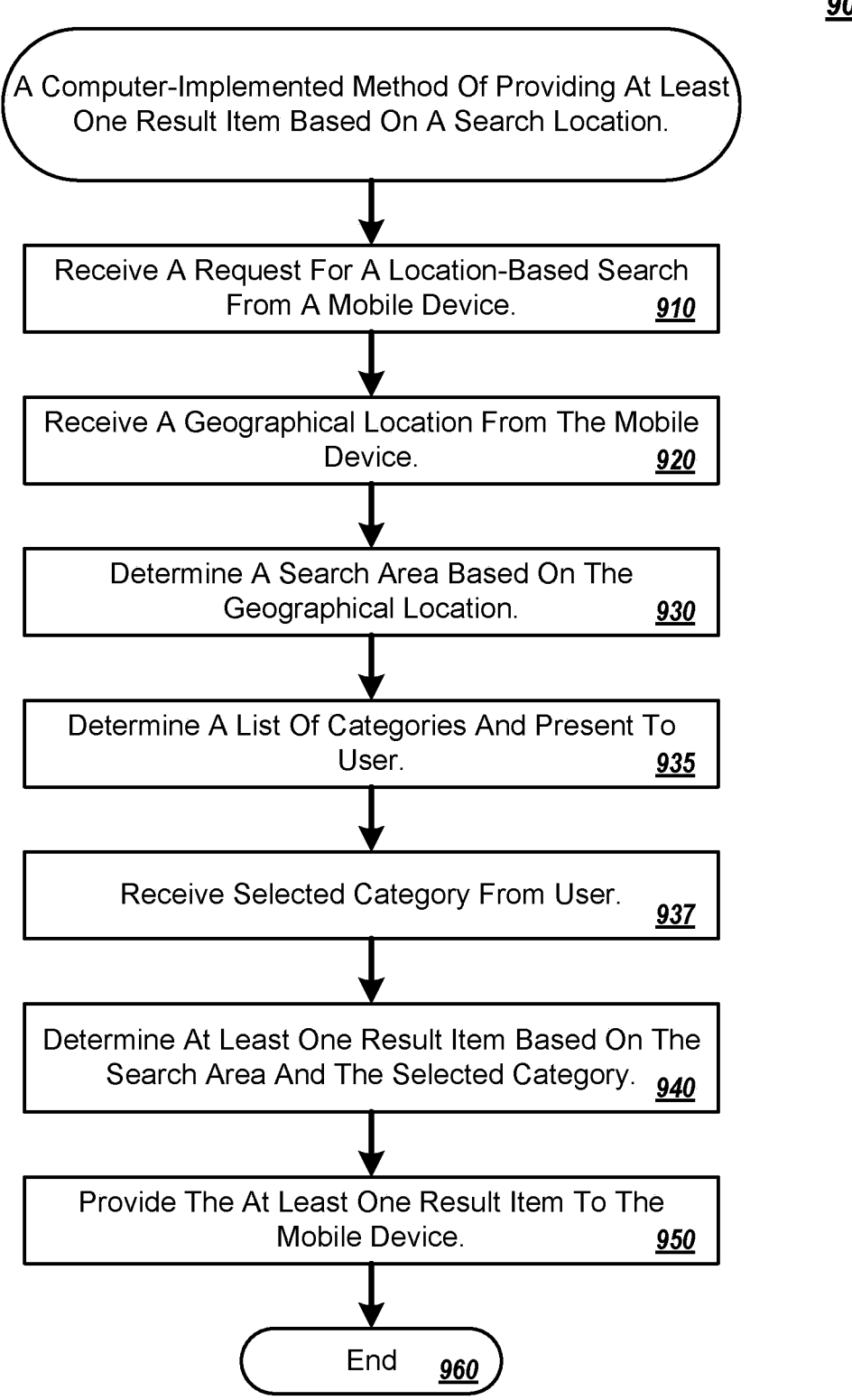

As shown in FIG. 9A, an implementation of method 900 begins at stage 910 where a request is received to perform a search. In an implementation, a location search server, such as location search server 250 of FIGS. 3A-C, may receive a request for a location-based search from a mobile device. Once stage 910 is complete, method 900 proceeds to stage 920.

At stage 920, a geographical location is received from the mobile device. In an implementation, a location determiner, such as location determiner 330 of FIGS. 3A-C, may determine or estimate the geographical location of a mobile device and transmit this geographical location to location-search server 250. Once stage 920 is complete, method 900 continues to stage 930.

At stage 930, a search area is determined based on the geographical location. In an implementation, a search area determiner, such as search area determiner 340 of FIGS. 3A-C, may determine this search area. Once stage 930 is complete, method 900 proceeds to stage 935.

At stage 935, a list of search categories is determined and presented to the user for selection. In an implementation, a category determiner, such as category determiner 360 of FIGS. 3A-C, may determine a list of search categories. In an implementation, a display, such as display 320 of FIGS. 3A-C, may display the category list. Once stage 935 is complete, method 900 continues to stage 937, where a selected category is received from the user. Once stage 937 is complete, method 900 continues to stage 940.

At stage 940, at least one result item is determined based on the search area and the user-selected category. In an implementation, a location search server, such as location search server 250 of FIGS. 3A-C, may determine this at least one result item. Once stage 940 is complete, method 900 proceeds to stage 950.

At stage 950, the at least one result item is provided to the mobile device. In an implementation, a mobile device, such as mobile device 110 of FIGS. 1, 2 and 3A-C, may receive the at least one search item. Once stage 950 is complete, method 900 ends (stage 960).

Stages 910, 920, 930, 935, 937, 940 and 950 may be implemented as software, hardware, firmware, or any combination thereof.

As shown in FIG. 9B, an implementation of method 900 begins at stage 920 where a geographical location is determined. In an implementation, a location determiner, such as location determiner 330 of FIGS. 3A-C, may determine or estimate the geographical location of a mobile device. Once stage 920 is complete, method 900 continues to stage 910.

At stage 910, a request is received to perform a search. In an implementation, a search requester, such as search requester 325 of FIGS. 3A-C, may receive a request from a user to perform a search. Once stage 910 is complete, method 900 proceeds to stage 915.

At stage 915, a list of potential search areas is determined based on the geographical location. In an implementation, a search area determiner, such as search area determiner 340 of FIGS. 3A-C, may determine these potential search areas. Once stage 915 is complete, method 900 proceeds to stage 917, where the potential search areas are presented to the user, and the user is enabled to select a search area. At stage 919, the selected search area is received, and method 900 proceeds to stage 940.

At stage 940, at least one result item is determined based on the selected search. In an implementation, a location search server, such as location search server 250 of FIGS.

3A-C, may determine this at least one result item based on the search area. Once stage 940 is complete, method 900 proceeds to stage 950.

At stage 950, the at least one result item is provided to the mobile device. In an implementation, a mobile device, such as mobile device 110 of FIGS. 1, 2 and 3A-C, may receive the at least one search item. Once stage 950 is complete, method 900 ends. Once stage 950 is complete, method 900 ends.

Stages 920, 910, 915, 917, 919, 940 and 950 may be implemented as software, hardware, firmware, or any combination thereof.

Example Computer System Implementation

Figure 10:
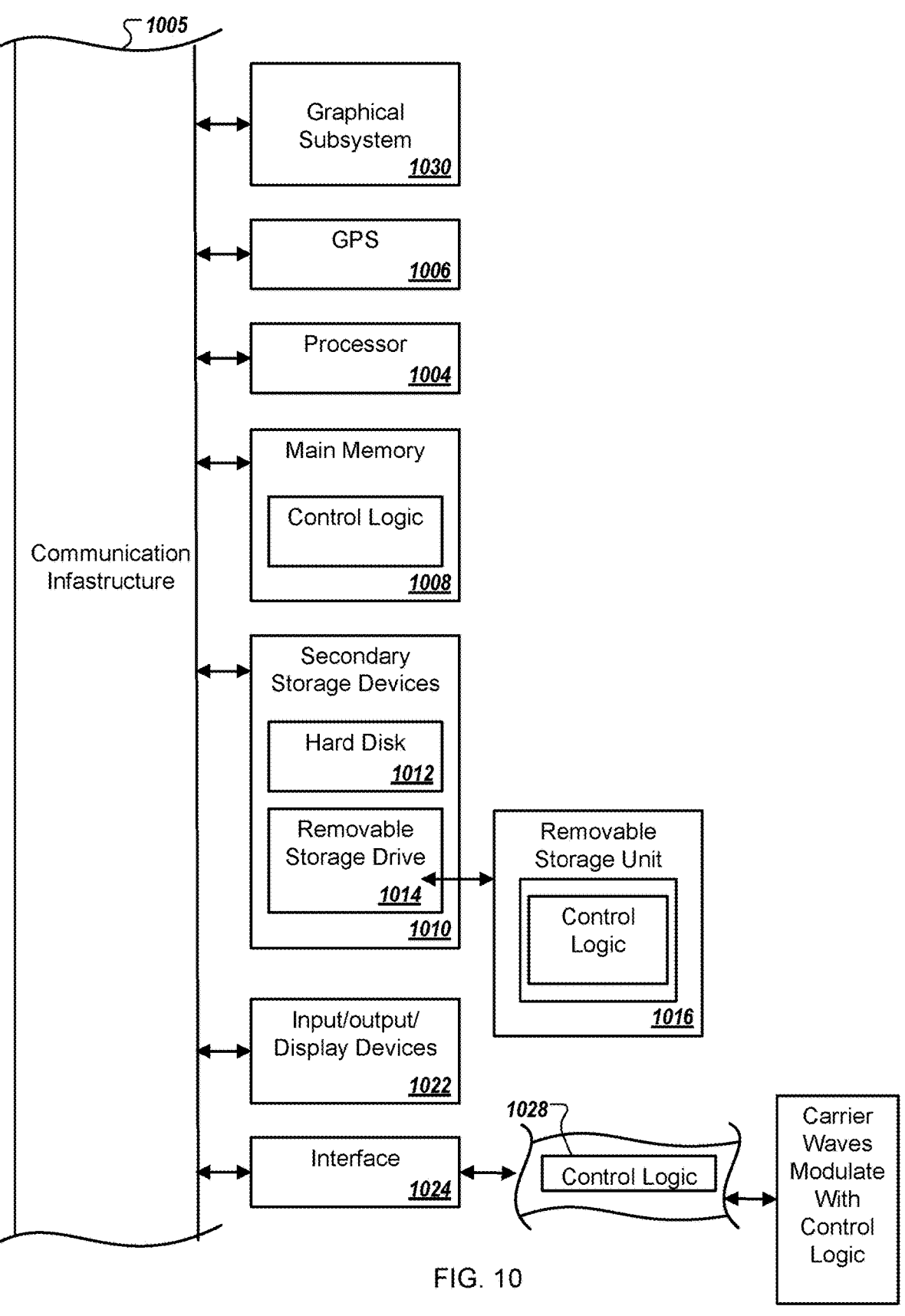
FIG. 10 depicts a sample computer system that may be used to implement one implementation.

Implementations described herein may be implemented using hardware, software or a combination thereof and may be implemented in a computer system or other processing system, including a mobile telephone or other mobile processing system. Hardware, software or any combination of such may embody any of the modules in FIGS. 1, 2, 3A-C and any stage in FIGS. 9A-B. In an implementation, there is disclosed a computer-readable medium having computer-readable instructions encoded thereon that, when executed by a processor cause the processor to perform a method described in implementations. An example of a computer system 1000 with a processor capable of executing the method described is shown in FIG. 10. Computer system 1000 includes one or more processors, such as processor 1004. Processor 1004 is connected to a communication bus 1005. Various software implementations are described in terms of this example computer system.

In an implementation, an example computer system 1000 that is a mobile device may include a GPS 1006 for the determination of a geographical location of the device.

Computer system 1000 also includes a main memory 1008, such as random access memory (RAM) or solid state memory, and may also include a secondary memory 1010. Secondary memory 1010 may include, for example, a hard disk drive 1012 and/or a removable storage drive 1014, representing a floppy disk drive, a magnetic tape drive, an optical disk drive, memory card port, etc. Removable storage drive 1014 reads from and/or writes to a removable storage unit 1016 in a well-known manner. Removable storage unit 1016, represents magnetic tape, optical disk, memory card, etc. which is read by and written to by removable storage drive 1014. As will be appreciated main memory 1008 and removable storage unit 1016 include a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1016 and an interface. Examples of such may include a removable memory chip (such as an EPROM, or PROM) and associated socket, and other removable storage units 1016 and interfaces which allow software and data to be transferred from removable storage unit 1016 to computer system 1000.

Computer system 1000 may also include a communication interface 1024. Communication interface 1024 enables computer system 1000 to communicate with external and/or remote devices. For example, communication interface 1024 allows software and data to be transferred between computer system 1000 and external devices. Communication interface 1024 also allows computer system 1000 to communicate over communication networks, such as LAN, WANs, the Internet, etc. Communication interface 1024 may interface with remote sites or networks via wired or wireless connections. Examples of communications interface 1024 may include a modem, a network interface (such as an Ethernet card), a communications port, a PCMCIA slot and card, etc. Computer system 1000 receives data and/or computer program products via communication interface 1024. Software and data transferred via communications interface 1024 are in the form of signals 1028 which may be electronic, electromagnetic, optical or other signals capable of being received by communications interface 1024. Signals 1028 are provided to communications interface 1024 via a communications path (i.e., channel). This channel carries signals 1028 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 1014, and a hard disk installed in hard disk drive 1012. These computer program products are means for providing software to computer system 1000.

Computer programs (also called computer control logic) are stored in main memory 1008 and/or secondary memory 1010. Computer programs may also be received via signal 1028 and communications interface 1024. Such computer programs, when executed, enable computer system 1000 to perform the features discussed herein. In particular, the computer programs, when executed, enable processor 1004 to perform the features discussed in this specification. Accordingly, such computer programs represent controllers of computer system 1000.

In an implementation implemented using software, the software may be stored in a computer program product and loaded into computer system 1000 using removable storage drive 1014, hard disk drive 1012 or communications interface 1024. The control logic (software), when executed by processor 1004, causes processor 1004 to perform the functions as described herein.

Computer system 1000 also may include input/output/display devices 1032, such as touchscreens, keyboards, keypads, trackballs, pointing devices, etc.

The systems discussed here may work with software, hardware, and operating system implementations other than those described herein. Any software, hardware, and operating system implementations suitable for performing the functions described herein may be used.

Figure 11:
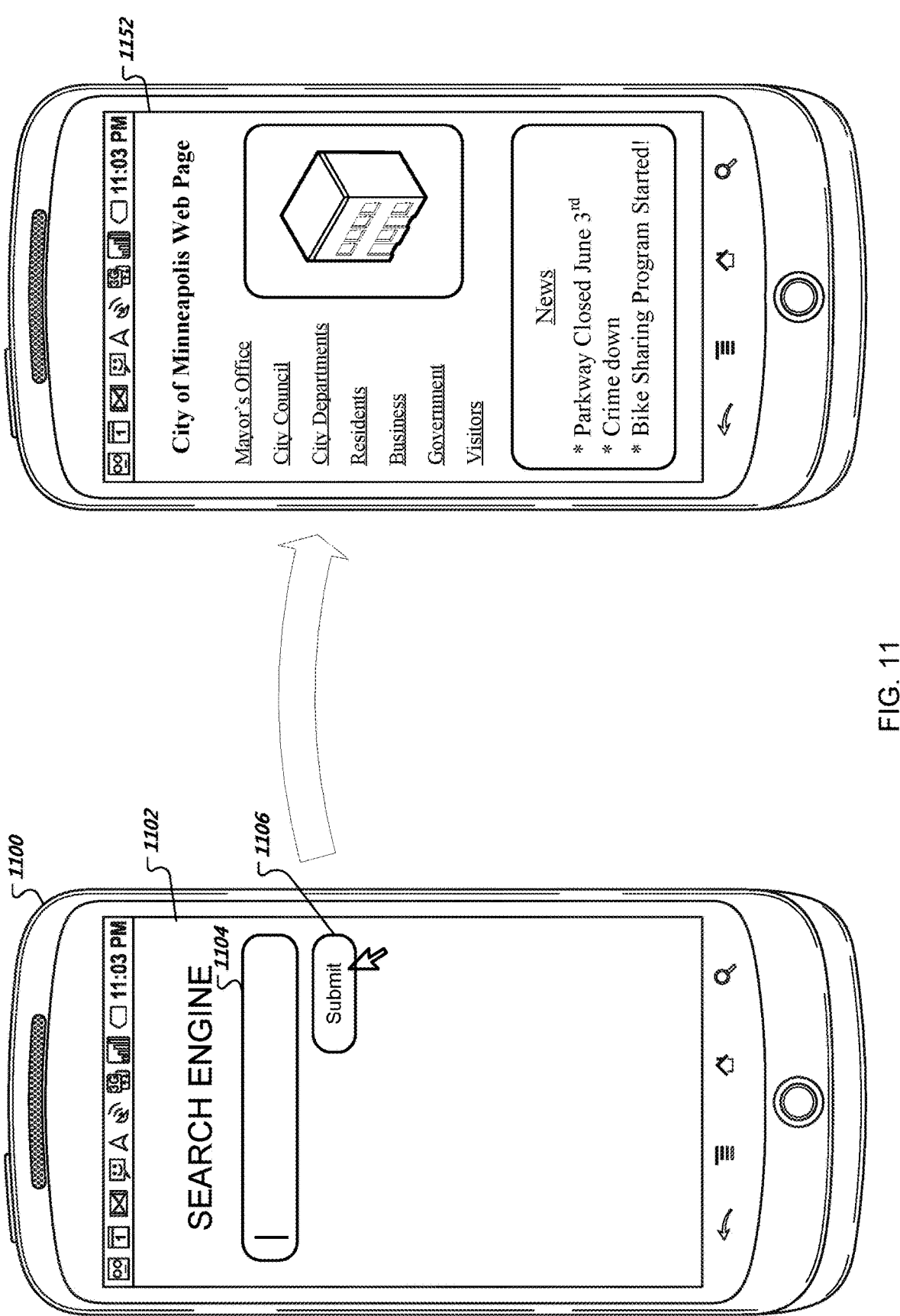
FIG. 11 illustrates a location-based search performed by a mobile computing device.

FIG. 11 illustrates a location-based search performed by a mobile computing device. In this illustration, a user is viewing a display of a webpage 1102 on a mobile computing device 1100. The webpage 1102 includes a query input text box 1104 for receiving user input that defines a text query. For example, a user may select the query input text box 1104 by pressing his finger at a location of the query input text box 1104, and may thereafter enter characters into the query input text box 1104 using a physical or virtual keyboard. The user may submit the entered query by selecting a query submission interface element 1106. Upon selection of the query submission interface element 1106, a server system may identify search results that are responsive to the entered search query, and provide a list of search results to the mobile computing device 1100 for display to the user.

In this illustration, however, the user selects the query submission interface element 1106 without defining a text query using the query input text box 1104. In response to the user selection, the display of the webpage 1102 is replaced with a display of the webpage 1152. In this example, the webpage 1152 is hosted by the City of Minneapolis. The mobile computing device may be located in the city of Minneapolis. Thus, selection of the query submission interface element 1106 (without a query in the text box 1104) may cause the mobile computing device 1100 to request that a server system return content that is associated with a search result for the geographical location.

The server system may take an estimated geographical location of the mobile computing device and determine a search area based, at least in part, on the estimated geographical location. The determined search area in this example may be "Minneapolis." Thus, the server system may query a search engine with the textual query "Minneapolis." A single, most-relevantly ranked search result may be selected by the server system, and a URL that the selected search result identifies may be provided to the mobile computing device for display as a web page. For example, the server system may request that the mobile computing device perform a redirect in order to retrieve resources that correspond to the URL.

In various examples, an "empty" query is submitted to the server system when a user selects the text box for input of textual characters and, without entering the characters, selects a keyboard key that would ordinarily submit the query (e.g., an "enter" or "return" key). In various examples, an "empty" query is submitted to the server system when a user selects the text box for input of textual characters and fails to enter characters within a determined amount of time (e.g., five seconds).

In various examples, the web page 1152 that is displayed on the user device 1100 following selection of the query submission interface element 1106 presents information identifying a list of search results that are relevant to the selected search area. In various examples, submission of an "empty" query causes a box to drop down from the query input text box 1102, where the box includes suggested search queries that have been determined to be relevant to the geographical location, or search results that have been determined to be relevant to the geographical location.

Figure 12:
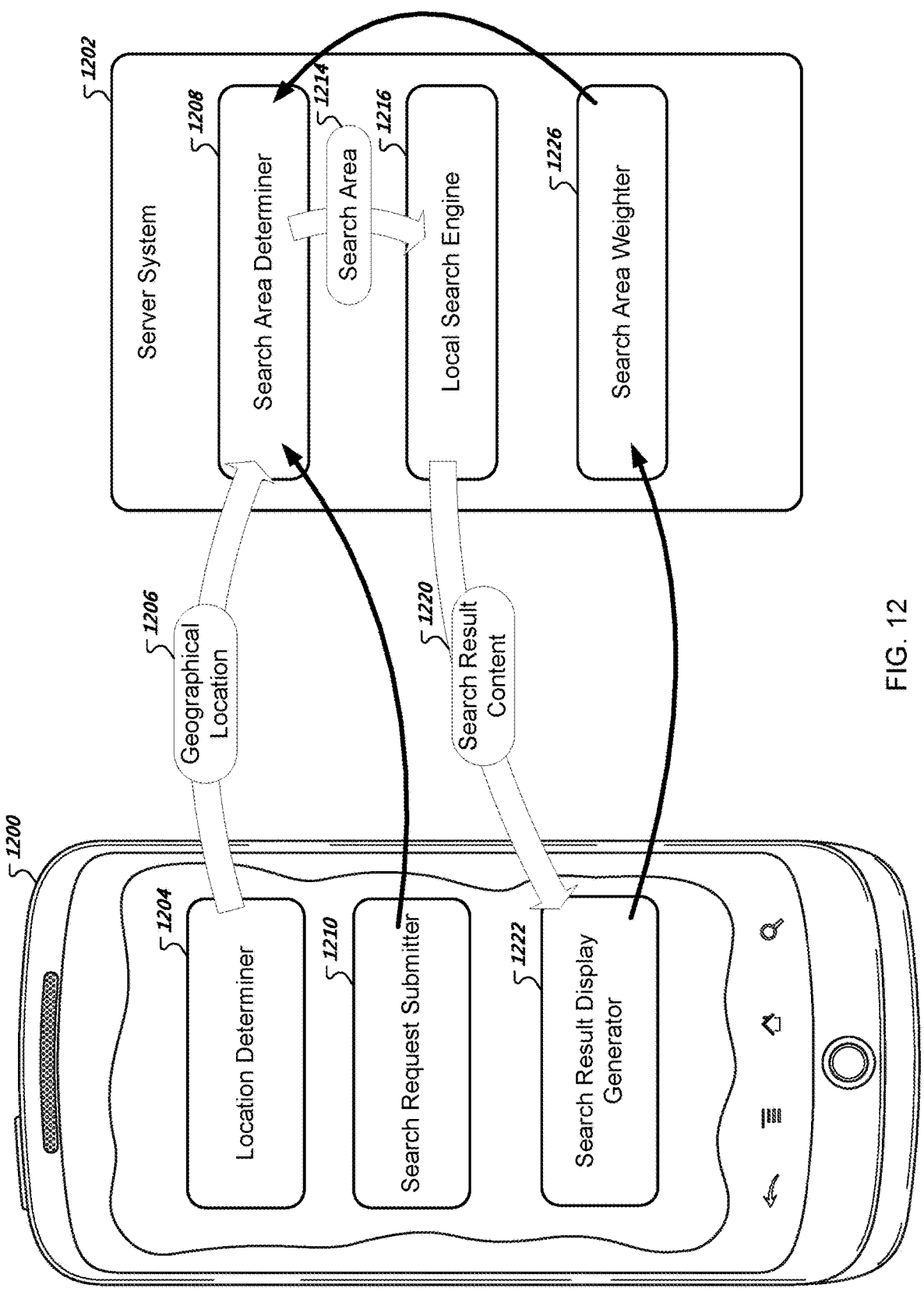
FIG. 12 is a conceptual diagram of a system for performing location-based searching based on communication between a mobile computing device and a server system.

FIG. 12 is a conceptual diagram of a system for performing location-based searching based on communication between a mobile computing device and a server system. Mobile computing device 1200 submits a geographical location 1206 to a server system 1202, which uses the geographical location 1206 to determine a search area 1214. A local search engine 1216 uses the search area 1214 to identify a search result. Content for the search result 1220 is transmitted to the mobile computing device 1200, which displays the content.

In more detail, the location determiner 1204 determines an estimated geographical location of the mobile computing device 1200. For example, the location determiner 1204 may identify a location at which a user has "checked-in" to provide posts to a social network (e.g., so that recipients of the posts see a location at which the user is "checked-in"). The location determiner 1204 may also use signals from transmitting devices to determine the location. Identification of a location of one or more sources of the signals, or triangulation of the device using multiple signals may be used to identify the device's location. The determined geographical location may be an estimated geographical location of the mobile computing device.

The mobile computing device 1200 transmits the geographical location 1206 to a server system. The transmission may occur periodically as the mobile computing device informs the server system of the geographical location of the computing device 1200. In some examples, the geographical location 1206 is provided with, or in response to, a request by the search request submitter 1210.

The search request submitter 1210 provides an indication to the server system that causes the server system to determine a search result that is responsive to the geographical location 1206. For example, the search request submitter 1210 may be a web browser and the request may be an HTTP request for resources for a particular web page, or an XHR request for code to generate a graphical user interface element that may be part of a web page that is being displayed. In some examples, the request may not include a user-generated query (e.g., a query that the user typed or spoke). In some examples, the request is provided by a web browser to the server system in response to a user of the mobile computing device selecting a search query submission interface element, when a user-defined query for a field associated with the submission interface element has not been provided.

The search area determiner 1208 receives a geographical location of a mobile computing device and selects a search area for the mobile computing device based on the received geographical location. The search area may be selected from several search areas that identify regions that include or are near the mobile computing device. Selection of the search area may be based on various factors, including a speed at which the user is traveling, a direction in which the user is traveling, an accuracy of the geographical location determination, user interaction with search results that have been generated using particular search areas (as discussed in more detail throughout this document), and user modification of a suggested search area. The mobile computing device may not receive user input that defines the selected search area. In various examples, the selected search area is represented by a descriptive string of human words.

A local search engine 1216 receives the selected search area 1214 and determines a search result that is responsive to the selected search area 1214. In various examples, the search engine queries a database identifying information on web pages from across the internet. Thus, the string of words may be used as a query, and one or more search results may be selected based on the string of words. Accordingly, a webpage may be identified by a relevantly ranked search result that is responsive to an original request that is associated with geographical coordinates, even though the web-site may not identify a geographical location as coordinates. As an illustration, a webpage for the City of Minneapolis may not identify latitude and longitude coordinates for the city, however, a search result for the City of Minneapolis webpage may be selected as being responsive to a search query that includes the search area "Minneapolis" in a string of words. The City of Minneapolis webpage may include the word Minneapolis numerous times and may be linked to by websites that use the anchor text "Minneapolis, MN."

In some examples, the search result is selected from a repository of web pages that identify locations and venues, where the repository is hosted by a single information provider. The repository may identify locations and venues for numerous businesses, parks, buildings, cities, etc. Each entry for a location or venue may identify corresponding search areas.

Content for the search result 1220 may be transmitted to the mobile computing device. In some examples, the content includes a descriptive name for the search result (e.g., a name of a venue that the search result identifies), and a URI that is associated with the search result (e.g., a URI for a website that is hosted by the venue or that describes the venue).

The search result display generator 1222 may be a web browser that receives the search result content and provides a visible indication of the search result content on a web page. For example, the search result display generator 1222 may generate, on a search engine website, a graphical interface element that includes text displaying the descriptive name and that, when selected, causes the web browser to navigate to a website for the URI.

In another example, the content for the search result 1220 may include a redirect request for a URI that is associated with the search result. Thus, the search result display generator 1222 may receive the redirect request, request resources that correspond to the URI over a network, and generate a display of a webpage that includes content that corresponds to the resources.

The search area weighter 1226 may store statistical data about user-interactions with search results that were generated based on a search area as a query, and weight a score for a search area based on the user interactions. For example, a search area may be selected for a user automatically by the server system and may be used to generate a display of a search result. If the user changes the search area (e.g., by selecting a link that displays the current search area and selecting a different search area from a list of alternative search areas that appears), the scores for the search area and the alternative search area may be modified.

Figure 13:
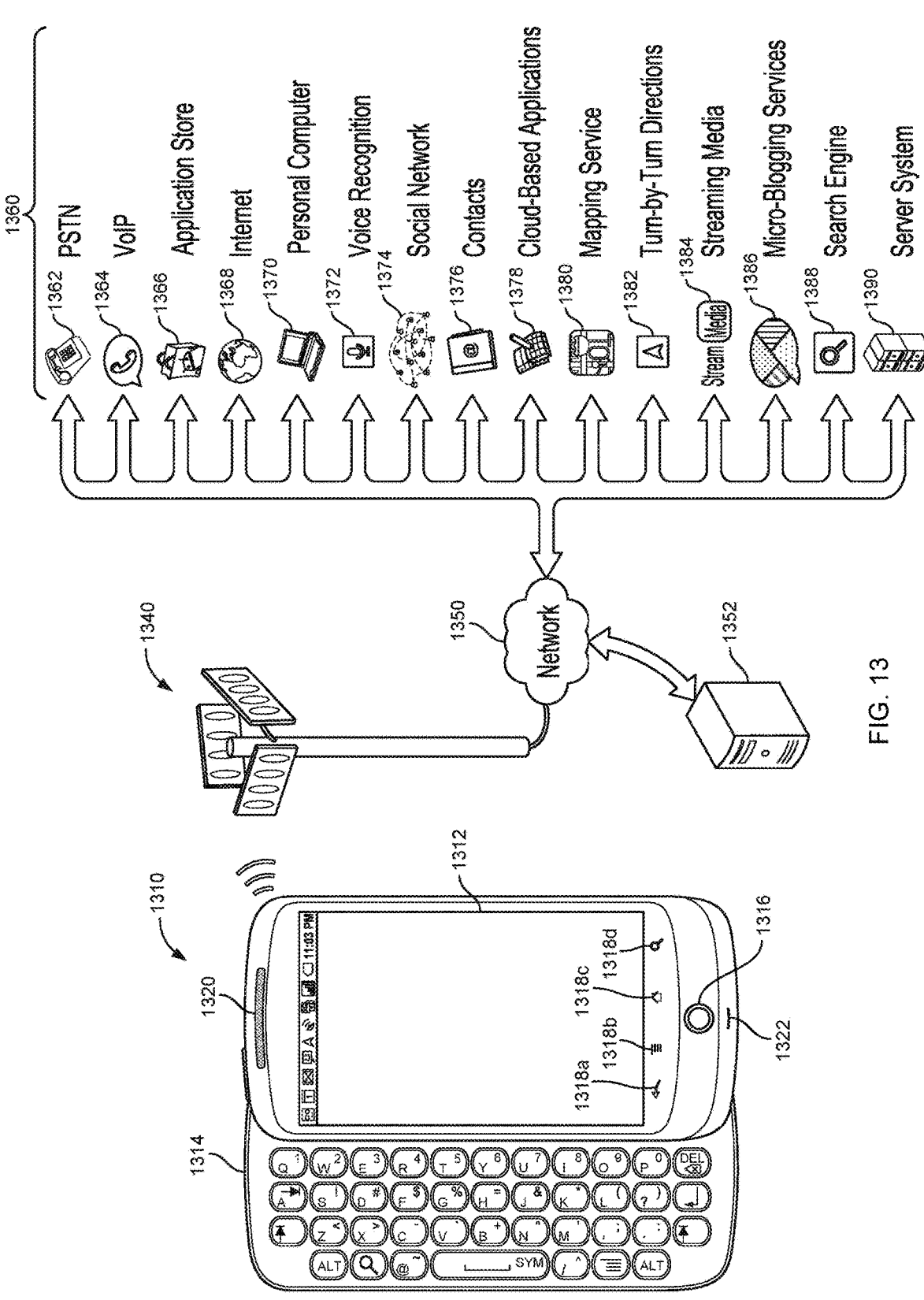
FIG. 13 is a conceptual diagram of a system that may be used to implement the systems and methods described in this document

Referring now to FIG. 13, a conceptual diagram of a system that may be used to implement the systems and methods described in this document is illustrated. Mobile computing device 1310 can wirelessly communicate with base station 1340, which can provide the mobile computing device wireless access to numerous services 1360 through a network 1350.

In this illustration, the mobile computing device 1310 is depicted as a handheld mobile telephone (e.g., a smartphone or an application telephone) that includes a touchscreen display device 1312 for presenting content to a user of the mobile computing device 1310. The mobile computing device 1310 includes various input devices (e.g., keyboard 1314 and touchscreen display device 1312) for receiving user-input that influences the operation of the mobile computing device 1310. In further implementations, the mobile computing device 1310 may be a laptop computer, a tablet computer, a personal digital assistant, an embedded system (e.g., a car navigation system), a desktop computer, or a computerized workstation.

The mobile computing device 1310 may include various visual, auditory, and tactile user-output mechanisms. An example visual output mechanism is display device 1312, which can visually display video, graphics, images, and text that combine to provide a visible user interface. For example, the display device 1312 may be a 3.7 inch AMO-LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 1312). Further, the mobile computing device 1310 may include one or more speakers 1320 that convert an electrical signal into sound, for example, music, an audible alert, or voice of an individual in a telephone call.

An example mechanism for receiving user-input includes keyboard 1314, which may be a full qwerty keyboard or a traditional keypad that includes keys for the digits '0-9', '*', and ' #.' The keyboard 1314 receives input when a user physically contacts or depresses a keyboard key. User manipulation of a trackball 1316 or interaction with a trackpad enables the user to supply directional and rate of rotation information to the mobile computing device 1310 (e.g., to manipulate a position of a cursor on the display device 1312).

The mobile computing device 1310 may be able to determine a position of physical contact with the touchscreen display device 1312 (e.g., a position of contact by a finger or a stylus). Using the touchscreen 1312, various "virtual" input mechanisms may be produced, where a user interacts with a graphical user interface element depicted on the touchscreen 1312 by contacting the graphical user interface element. An example of a "virtual" input mechanism is a "software keyboard," where a keyboard is displayed on the touchscreen and a user selects keys by pressing a region of the touchscreen 1312 that corresponds to each key.

The mobile computing device 1310 may include mechanical or touch sensitive buttons 1318_a-d_. Additionally, the mobile computing device may include buttons for adjusting volume output by the one or more speakers 1320, and a button for turning the mobile computing device on or off. A microphone 1322 allows the mobile computing device 1310 to convert audible sounds into an electrical signal that may be digitally encoded and stored in computer-readable memory, or transmitted to another computing device. The mobile computing device 1310 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 1310 may present a graphical user interface with the touchscreen 1312. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1304. User-selection of the button may invoke the pre-defined action.

In some examples, the operating system provides a "desktop" user interface that is displayed upon turning on the mobile computing device 1310, activating the mobile computing device 1310 from a sleep state, upon "unlocking" the mobile computing device 1310, or upon receiving user-selection of the "home" button 1318*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 1310 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 1312 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 1310 may include one or more location-identification mechanisms. A location-identification mechanism may include a collection of hardware and software that provides the operating system and application programs an estimate of the mobile telephone's geographical location. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 1310 may include other application modules and hardware. A call handling unit may receive an indication of an incoming telephone call and provide a user capabilities to answer the incoming telephone call. A media player may allow a user to listen to music or play movies that are stored in local memory of the mobile computing device 1310. The mobile telephone 1310 may include a digital camera sensor, and corresponding image and video capture and editing software. An internet browser may enable the user to view content from a web page by typing in an addresses corresponding to the web page or selecting a link to the web page.

The mobile computing device 1310 may include an antenna to wirelessly communicate information with the base station 1340. The base station 1340 may be one of many base stations in a collection of base stations (e.g., a mobile telephone cellular network) that enables the mobile computing device 1310 to maintain communication with a network 1350 as the mobile computing device is geographically moved. The computing device 1310 may alternatively or additionally communicate with the network 1350 through a Wi-Fi router or a wired connection (e.g., Ethernet, USB, or FIREWIRE). The computing device 1310 may also wirelessly communicate with other computing devices using BLUETOOTH protocols, or may employ an ad-hoc wireless network.

A service provider that operates the network of base stations may connect the mobile computing device 1310 to the network 1350 to enable communication between the mobile computing device 1310 and other computerized devices that provide services 1360. Although the services 1360 may be provided over different networks (e.g., the service provider's internal network, the Public Switched Telephone Network, and the Internet), network 1350 is illustrated as a single network. The service provider may operate a server system 1352 that routes information packets and voice data between the mobile computing device 1310 and computing devices associated with the services 1360.

The network 1350 may connect the mobile computing device 1310 to the Public Switched Telephone Network (PSTN) 1362 in order to establish voice or fax communication between the mobile computing device 1310 and another computing device. For example, the service provider server system 1352 may receive an indication from the PSTN 1362 of an incoming call for the mobile computing device 1310. Conversely, the mobile computing device 1310 may send a communication to the service provider server system 1352 initiating a telephone call with a telephone number that is associated with a device accessible through the PSTN 1362.

The network 1350 may connect the mobile computing device 1310 with a Voice over Internet Protocol (VOIP) service 1364 that routes voice communications over an IP network, as opposed to the PSTN. For example, a user of the mobile computing device 1310 may invoke a VoIP application and initiate a call using the program. The service provider server system 1352 may forward voice data from the call to a VoIP service, which may route the call over the internet to a corresponding computing device, potentially using the PSTN for a final leg of the connection.

An application store 1366 may provide a user of the mobile computing device 1310 the ability to browse a list of remotely stored application programs that the user may download over the network 1350 and install on the mobile computing device 1310. The application store 1366 may serve as a repository of applications developed by third-party application developers. An application program that is installed on the mobile computing device 1310 may be able to communicate over the network 1350 with server systems that are designated for the application program. For example, a VoIP application program may be downloaded from the Application Store 1366, enabling the user to communicate with the VoIP service 1364.

The mobile computing device 1310 may access content on the internet 1368 through network 1350. For example, a user of the mobile computing device 1310 may invoke a web browser application that requests data from remote computing devices that are accessible at designated universal resource locations. In various examples, some of the services 1360 are accessible over the internet.

The mobile computing device may communicate with a personal computer 1370. For example, the personal computer 1370 may be the home computer for a user of the mobile computing device 1310. Thus, the user may be able to stream media from his personal computer 1370. The user may also view the file structure of his personal computer 1370, and transmit selected documents between the computerized devices.

A voice recognition service 1372 may receive voice communication data recorded with the mobile computing device's microphone 1322, and translate the voice communication into corresponding textual data. In some examples, the translated text is provided to a search engine as a web query, and responsive search engine search results are transmitted to the mobile computing device 1310.

The mobile computing device 1310 may communicate with a social network 1374. The social network may include numerous members, some of which have agreed to be related as acquaintances. Application programs on the mobile computing device 1310 may access the social network 1374 to retrieve information based on the acquaintances of the user of the mobile computing device. For example, an "address book" application program may retrieve telephone numbers for the user's acquaintances. In various examples, content may be delivered to the mobile computing device 1310 based on social network distances from the user to other members. For example, advertisement and news article content may be selected for the user based on a level of interaction with such content by members that are "close" to the user (e.g., members that are "friends" or "friends of friends").

The mobile computing device 1310 may access a personal set of contacts 1376 through network 1350. Each contact may identify an individual and include information about that individual (e.g., a phone number, an email address, and a birthday). Because the set of contacts is hosted remotely to the mobile computing device 1310, the user may access and maintain the contacts 1376 across several devices as a common set of contacts.

The mobile computing device 1310 may access cloud-based application programs 1378. Cloud-computing provides application programs (e.g., a word processor or an email program) that are hosted remotely from the mobile computing device 1310, and may be accessed by the device 1310 using a web browser or a dedicated program. Example cloud-based application programs include GOOGLE DOCS word processor and spreadsheet service, GOOGLE GMAIL webmail service, and PICASA picture manager.

Mapping service 1380 can provide the mobile computing device 1310 with street maps, route planning information, and satellite images. An example mapping service is GOOGLE MAPS. The mapping service 1380 may also receive queries and return location-specific results. For example, the mobile computing device 1310 may send an estimated location of the mobile computing device and a user-entered query for "pizza places" to the mapping service 1380. The mapping service 1380 may return a street map with "markers" superimposed on the map that identify geographical locations of nearby "pizza places."

Turn-by-turn service 1382 may provide the mobile computing device 1310 with turn-by-turn directions to a user-supplied destination. For example, the turn-by-turn service 1382 may stream to device 1310 a street-level view of an estimated location of the device, along with data for providing audio commands and superimposing arrows that direct a user of the device 1310 to the destination.

Various forms of streaming media 1384 may be requested by the mobile computing device 1310. For example, computing device 1310 may request a stream for a pre-recorded video file, a live television program, or a live radio program. Example services that provide streaming media include YOUTUBE and PANDORA.

A micro-blogging service 1386 may receive from the mobile computing device 1310 a user-input post that does not identify recipients of the post. The micro-blogging service 1386 may disseminate the post to other members of the micro-blogging service 1386 that agreed to subscribe to the user.

A search engine 1388 may receive user-entered textual or verbal queries from the mobile computing device 1310, determine a set of internet-accessible documents that are responsive to the query, and provide to the device 1310 information to display a list of search results for the responsive documents. In examples where a verbal query is received, the voice recognition service 1372 may translate the received audio into a textual query that is sent to the search engine.

These and other services may be implemented in a server system 1390. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 14:
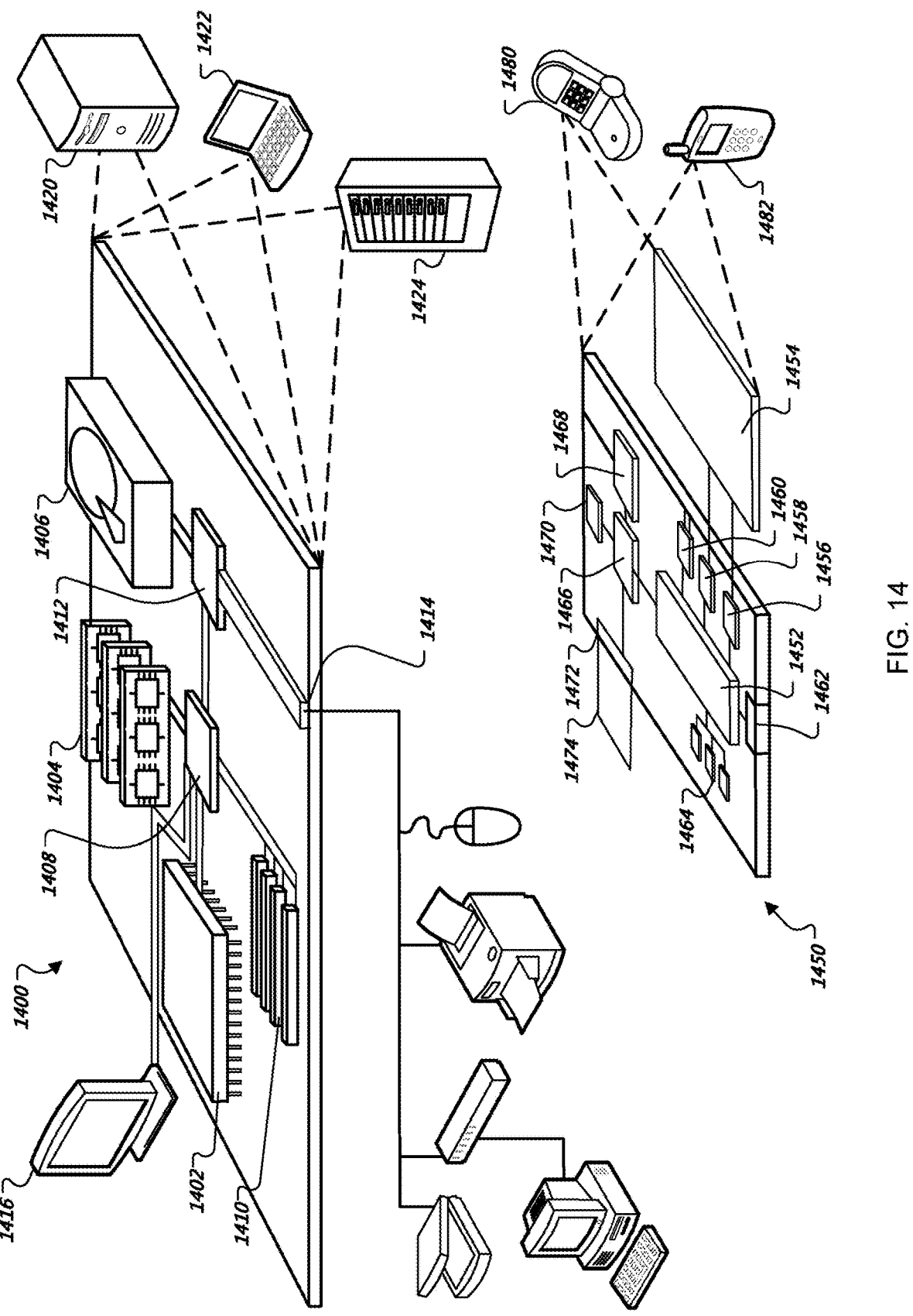
FIG. 14 is a block diagram of computing devices that may be used to implement the systems and methods described in this document, as either a client or as a server or plurality of servers.

FIG. 14 is a block diagram of computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. Additionally computing device 1400 or 1450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT (Thin-Film-Transistor Liquid Crystal Display) display or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452 that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

As an alternative to the attached claims and the embodiments described in the above description, the present invention could also be described by one of the following embodiments:

Embodiment 1 is directed to a computer-implemented method for providing location-based information, the method comprising: receiving, at a server system, a geographical location of a mobile computing device; receiving, at the server system and from the mobile computing device, a request for content; selecting, by the server system, a search area that corresponds to the geographical location, the search area selected from among a collection of search areas that correspond to the geographical location, at least one of the search areas in the collection being geographically nested within at least one other of the search areas; determining, by the server system, a search result that is most-relevantly ranked for the selected search area; and providing, by the server system and for receipt by the mobile computing device, content that represents the determined search result.

Embodiment 2 is related to the method of embodiment 1 wherein: the request is an HTTP request for resources, the request does not include a query that was generated by a user of the mobile computing device and that is for a search engine system, and the server system selects the search area and determines the search area without using a query that was generated by a user of the mobile computing device and that is for a search engine system.

Embodiment 3 is related to the method of embodiment 1 or 2, wherein each of the search areas in the collection of search areas is assigned a different descriptive phrase of one or more human-understandable language words, and determining the search result includes submitting to a search engine system a query that includes the descriptive phrase that is assigned to the selected search area.

Embodiment 4 is related to the method of any one of embodiments 1 through 3, wherein the determined search result does not correspond to content that identifies a location using geographical coordinates.

Embodiment 5 is directed to a computer-implemented method for providing location-based information, the method comprising: determining, by a mobile computing device, a geographical location of the mobile computing device; providing, by the mobile computing device and for receipt by a server system that is remote from the mobile computing device, the geographical location; transmitting, by the mobile computing device and for receipt by the server system, a request for content, so as to cause the server system to: (i) select a search area that corresponds to the geographical location, the search area being selected from among a collection of search areas that correspond to the geographical location, at least one of the search areas in the collection being geographically nested within at least one other of the search areas, and (ii) determine a search result that is most-relevantly ranked for the selected search area; receiving, by the mobile computing device and from the server system, content that represents the determined search result; and displaying, by the mobile computing device, the content that represents the determined search result.

Embodiment 6 is related to the method of embodiment 5, wherein the content is displayed in a web page, the displayed content identifies a physical venue, and the web page does not include a display of content that represents another search result and that identifies another physical venue.

Embodiment 7 is related to the method of embodiment 6, wherein the web page displays, in addition to the content that identifies a physical venue: (i) a voice query input button for receiving user input to submit to a search engine system a voice query, (ii) an indication of the selected search area, and (iv) a user-selectable option for changing the selected search area.

Embodiment 8 is related to the method of embodiment 6, wherein the web page displays in addition to the content that identifies a physical venue: (i) a search box for receiving textual user input that defines a search query, (ii) a search button for receiving user input to submit to a search engine system the search query, (iii) an indication of the selected search area, and (iv) a user-selectable option for changing the selected search area.

Embodiment 9 is related to the method of embodiment 7 or 8, further comprising receiving user input, using the user-selectable option, that changes the selected search area to another search area in the collection of search areas; receiving, by the mobile computing device and in response to the user input changing the search area, content that represents a second search result that has been determined to be most-relevantly ranked for the other search area; and replacing the displayed content for the determined search result with a display of content for the second search result.

Embodiment 10 is related to the method of embodiment 9, further comprising, in response to receiving the user input changing the search area, modifying a score for the other search area so that the other search area is more-relevantly scored with respect to the search area than before the modifying of the score of the other search area, the score for the other search area being used in selection of one of the search area and the other search area for display in the web page.

Embodiment 11 is related to the method of embodiment 5, further comprising displaying, by the mobile computing device, a first webpage that includes: (i) a search box for receiving textual user input defining a search query, and (ii) a search button for receiving user input that submits the search query that was input in the search box to a search engine system; and receiving user input selecting the search button when the search box has not received user input defining a search query; wherein the transmitted request for content that represents a search result is transmitted by the mobile computing device in response to receiving the user input selecting the search button.

Embodiment 12 is related to the method of embodiment 11, wherein: the received content that represents the determined search result includes a Uniform Resource Identifier (URI) that the determined search result identifies, and displaying the content that represents the determined search result includes displaying a second web page that is identified by the URI.

Embodiment 13 is related to the method of embodiment 12, wherein the second web page is displayed by the mobile computing without receiving user input subsequent to receiving the user input selecting the search button.

Embodiment 14 is related to the method of embodiment 13, wherein the determined search result that identifies the URI is selected from a collection of search results that identify URIs of web pages that are hosted by a variety of different information providers.

Embodiment 15 is directed to a system for providing location-based information, the system comprising: a search area determiner that is configured to receive a geographical location of a requesting computing device and to select a search area that corresponds to the geographical location, the search area selected from among a collection of search areas that correspond to the geographical location, at least one of the search areas in the collection being geographically nested within at least one other of the search areas; a search engine that is configured to determine a search result that is most-relevantly ranked for a query that includes the selected search area, and to provide content representing the determined search result to the requesting computing device; and a plurality of mobile computing devices, wherein particular mobile devices in the plurality each include: a geographical location determiner for determining a particular geographical location of the particular computing device and for providing the particular geographical location to the search area determiner; and a search result display generator for receiving from the search engine content that represents a particular search result, and for displaying the content that represents the particular search result.

Embodiment 16 is related to the system of embodiment 15, wherein: the display of the content that represents the particular search result includes a selectable graphical interface element, and user-selection of the graphical interface element causes the mobile computing device to navigate to a display of additional content that represents the particular search result.

Embodiment 17 is related to the system of embodiments 15 or 16, further comprising a search area weighter to modify scores that are assigned to each of the search areas in the collection, wherein the scores for each of the search areas are used in the selection of the search area by the search area determiner.

Embodiment 18 is related to the system of embodiment 17, wherein the search area weighter modifies the score for the determined search area in response to a user-selection of the selectable graphical interface element that is for the particular search result.

Embodiment 19 is related to the system of embodiment 17 or 18, wherein: the display of additional content for the particular search result includes a display of a selectable graphical interface element for at least another search area in the collection other than the selected search area, and the search area weighter modifies the weight for the other search area in response to user selection of the graphical interface element for the other search area.

Embodiment 20 is related to the system of any one of embodiments 15 through 19, wherein the query does not include text that was input by a user of the mobile computing device.

Embodiment 21 is related to the system of any one of embodiments 15 through 20, wherein: the search engine determines the particular search result in response to a selection of a particular interface element, the particular interface element is used to submit from a computing device to the search engine a query that was defined by user content provided using a query input text box, and the selection of the particular interface element is performed when the query input text box has not been provided user content.

Embodiment 22 is related to the system of any one of embodiments 15 through 21, wherein the at least one of the search areas in the collection is completely geographically nested within at least the one other of the search areas.

Embodiment 23 is related to the system of any one of embodiments 15 through 21, wherein the at least one of the search areas in the collection is partially geographically nested within at least the one other of the search areas.

Embodiment 24 is related to the method of any one of embodiments 1 through 14, wherein the at least one of the search areas in the collection is completely geographically nested within at least the one other of the search areas.

Embodiment 25 is related to the method of any one of embodiments 1 through 14 wherein the at least one of the search areas in the collection is partially geographically nested within at least the one other of the search areas.

Embodiment 26 is directed to a recordable media having instructions stored thereon, the instructions, when executing by one or more processors, perform actions according the method of any one of embodiments 1 to 14.

Embodiment 27 is directed to a system including a recordable media having instructions stored thereon, the instructions, when executing by one or more processors, perform actions according the method of any one of embodiments 1 to 14.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing system, an indication of a geographical location of a computing device;
selecting, by the computing system based on the indication of the geographical location of the computing device, a first search area that corresponds to the geographical location, the first search area selected from among a collection of search areas that correspond to the geographical location, based on scores for search areas in the collection of search areas;
determining, by the computing system, a first search result that is most-relevantly ranked for the first search area;
providing, by the computing system and for receipt by the computing device in response to determining the first search result that is most-relevantly ranked for the first search area, first information to cause the computing device to present, together in a user interface:
(i) content that represents the first search result, and
(ii) text that describes the first search area;
receiving, by the computing system, an indication that user input at the computing device changed the first search area to a second search area in the collection of search areas;

determining, by the computing system, a second search result that is most-relevantly ranked for the second search area; and
providing, by the computing system and for receipt by the computing device in response to receiving the indication that the user input changed the first search area to the second search area, second information to cause the computing device to present, together in the user interface:
(iii) content that represents the second search result, and
(iv) different text that describes the second search area, wherein the second information is different from the first information.

2. The computer-implemented method of claim 1, wherein the indication of the geographical location of the computing device is an estimate of the geographical location of the computing device.

3. The computer-implemented method of claim 2, wherein the estimate of the geographical location of the computing device is based on an internet access point location determination.

4. The computer-implemented method of claim 1, wherein at least one search area in the collection of search areas is completely geographically nested within at least another search area within the collection of search areas.

5. The computer-implemented method of claim 1, wherein determining the first search result includes submitting a query to a search engine system and receiving the first search result from the search engine system.

6. The computer-implemented method of claim 1, wherein:
the indication of the geographical location includes geographical coordinates;
determining the first search result includes providing a query to a search engine system; and
the query does not include the geographical coordinates.

7. The computer-implemented method of claim 1, wherein:
each of the search areas in the collection of search areas is assigned a different descriptive phrase of one or more human-understandable language words; and
determining the first search result includes providing, to a search engine system, the descriptive phrase of one or more human-understandable language words that is assigned to the first search area, and receiving, in response from the search engine system, the first search result.

8. The computer-implemented method of claim 1, wherein selecting the first search area that corresponds to the geographical location is further based on a speed at which a user is traveling or a direction in which the user is traveling.

9. One or more computer-readable devices including instructions that, when executed by one or more programmable processors, cause the performance of actions that include:
receiving, by a computing system, an indication of a geographical location of a computing device;
selecting, by the computing system based on the indication of the geographical location of the computing device, a first search area that corresponds to the geographical location, the first search area selected from among a collection of search areas that correspond to the geographical location, based on scores for search areas in the collection of search areas;
determining, by the computing system, a first search result that is most-relevantly ranked for the first search area;

providing, by the computing system and for receipt by the computing device in response to determining the first search result that is most-relevantly ranked for the first search area, first information to cause the computing device to present, together in a user interface:
  (i) content that represents the first search result, and
  (ii) text that describes the first search area;

receiving, by the computing system, an indication that user input at the computing device changed the first search area to a second search area in the collection of search areas;

determining, by the computing system, a second search result that is most-relevantly ranked for the second search area; and providing, by the computing system and for receipt by the computing device in response to receiving the indication that the user input changed the first search area to the second search area, second information to cause the computing device to present, together in the user interface:
  (iii) content that represents the second search result, and
  (iv) different text that describes the second search area, wherein the second information is different from the first information.

10. The one or more computer-readable devices of claim 9, wherein the indication of the geographical location of the computing device is an estimate of the geographical location of the computing device.

11. The one or more computer-readable devices of claim 10, wherein the estimate of the geographical location of the computing device is based on an internet access point location determination.

12. The one or more computer-readable devices of claim 9, wherein at least one search area in the collection of search areas is completely geographically nested within at least another search area within the collection of search areas.

13. The one or more computer-readable devices of claim 9, wherein determining the first search result includes submitting a query to a search engine system and receiving the first search result from the search engine system.

14. A system comprising:

a processor, a computer-readable memory, one or more computer-readable storage media, and program instructions collectively stored on the one or more computer-readable storage media, the program instructions executable to:

select, by the computing system based on an indication of a geographical location of a computing device, a first search area that corresponds to the geographical location, the first search area selected from among a collection of search areas that correspond to the geographical location, based on scores for search areas in the collection of search areas;

determine, by the computing system, a first search result that is most-relevantly ranked for the first search area;

provide, by the computing system and for receipt by the computing device in response to determining the first search result that is most-relevantly ranked for the first search area, first information to cause the computing device to present, together in a user interface:
  (i) content that represents the first search result, and
  (ii) text that describes the first search area;

receive, by the computing system, an indication that user input at the computing device changed the first search area to a second search area in the collection of search areas;

determine, by the computing system, a second search result that is most-relevantly ranked for the second search area;

provide, by the computing system and for receipt by the computing device in response to receiving the indication that the user input changed the first search area to the second search area, second information to cause the computing device to present, together in the user interface:
  (iii) content that represents the second search result, and
  (iv) different text that describes the second search area, wherein the second information is different from the first information.

15. The system of claim 14, wherein the indication of the geographical location of the computing device is an estimate of the geographical location of the computing device.

16. The system of claim 15, wherein the estimate of the geographical location of the computing device is based on an internet access point location determination.

17. The system of claim 14, wherein at least one search area in the collection of search areas is completely geographically nested within at least another search area within the collection of search areas.

18. The system of claim 14, wherein determining the first search result includes submitting a query to a search engine system and receiving the first search result from the search engine system.

19. The system of claim 14, wherein:
the indication of the geographical location includes geographical coordinates;
determining the first search result includes providing a query to a search engine system; and
the query does not include the geographical coordinates.

20. The system of claim 15, wherein:
each of the search areas in the collection of search areas is assigned a different descriptive phrase of one or more human-understandable language words; and
determining the first search result includes providing, to a search engine system, the descriptive phrase of one or more human-understandable language words that is assigned to the first search area, and receiving, in response from the search engine system, the first search result.

* * * * *